US010437545B2

(12) United States Patent
Asai et al.

(10) Patent No.: US 10,437,545 B2
(45) Date of Patent: Oct. 8, 2019

(54) APPARATUS, SYSTEM, AND METHOD FOR CONTROLLING DISPLAY, AND RECORDING MEDIUM

(71) Applicant: Ricoh Company, Ltd., Tokyo (JP)

(72) Inventors: Takahiro Asai, Kanagawa (JP); Keiichi Kawaguchi, Kanagawa (JP); Makoto Torikoshi, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/855,443

(22) Filed: Dec. 27, 2017

(65) Prior Publication Data
US 2018/0181358 A1 Jun. 28, 2018

(30) Foreign Application Priority Data

Dec. 28, 2016 (JP) .................................. 2016-256383
Oct. 27, 2017 (JP) .................................. 2017-208675

(51) Int. Cl.
*G06T 11/00* (2006.01)
*G06F 3/14* (2006.01)
*G06T 11/60* (2006.01)

(52) U.S. Cl.
CPC ............ *G06F 3/1423* (2013.01); *G06T 11/00* (2013.01); *G06T 11/60* (2013.01)

(58) Field of Classification Search
None
See application file for complete search history.

(56) References Cited

U.S. PATENT DOCUMENTS

| 9,618,747 | B2 * | 4/2017 | Villmer ................ G02B 27/017 |
| 2013/0083063 | A1 * | 4/2013 | Geisner .................. G06F 3/011 345/633 |
| 2016/0050369 | A1 | 2/2016 | Takenaka et al. |
| 2016/0212336 | A1 | 7/2016 | Takenaka et al. |
| 2016/0379408 | A1 * | 12/2016 | Wright .................. G06T 19/006 345/633 |
| 2017/0269630 | A1 | 9/2017 | Kamezawa et al. |

FOREIGN PATENT DOCUMENTS

| JP | 2016-096487 | 5/2016 |
| JP | 2017-174394 | 9/2017 |

* cited by examiner

*Primary Examiner* — Robert J Craddock
(74) *Attorney, Agent, or Firm* — XSensus LLP

(57) ABSTRACT

An apparatus, system, and method for controlling a display, each of which: controls the display to display an image of a predetermined area of a first image, the first image being superimposed with a second image; determines whether the second image is viewed by a user; and switches a display of the second image between a first display in which the second image is displayed as a still image and a second display in which the second image is displayed as a moving image, based on a determination result indicating whether the second image is viewed by the user.

16 Claims, 29 Drawing Sheets

FIG. 7A
FIG. 7B
HEMISPHERICAL IMAGE (FRONT)
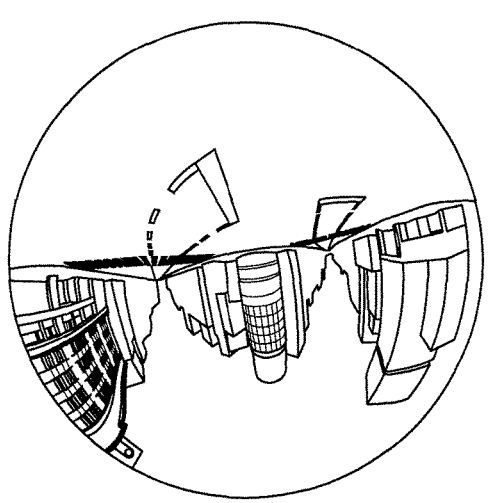
HEMISPHERICAL IMAGE (BACK)
FIG. 7C
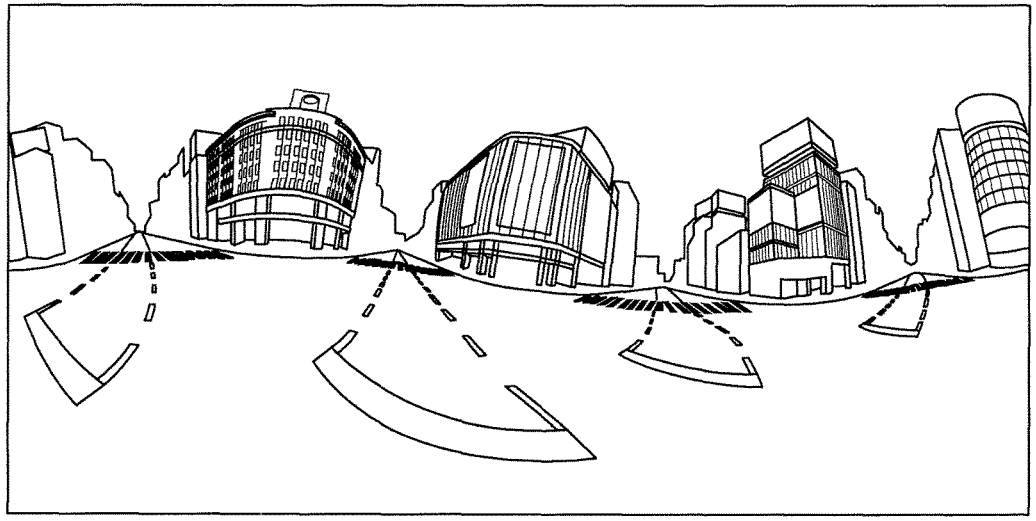
CAPTURED IMAGE (EQUIRECTANGULAR PROJECTION IMAGE)

SPHERICAL IMAGE

FIG. 13C

| x | y | λ | φ |
|---|---|---|---|
| −0.5 | 0.5 | −0.226 | 0.285 |
| −0.467 | 0.5 | −0.224 | 0.295 |
| −0.433 | 0.5 | −0.221 | 0.305 |
| −0.4 | 0.5 | −0.217 | 0.316 |
| −0.367 | 0.5 | −0.214 | 0.328 |
| −0.333 | 0.5 | −0.209 | 0.339 |
| −0.3 | 0.5 | −0.203 | 0.351 |
| ⋮ | ⋮ | ⋮ | ⋮ |
| 0.4 | −0.5 | 0.078 | −0.097 |
| 0.433 | −0.5 | 0.084 | −0.095 |
| 0.467 | −0.5 | 0.09 | −0.092 |
| 0.5 | −0.5 | 0.095 | −0.09 |

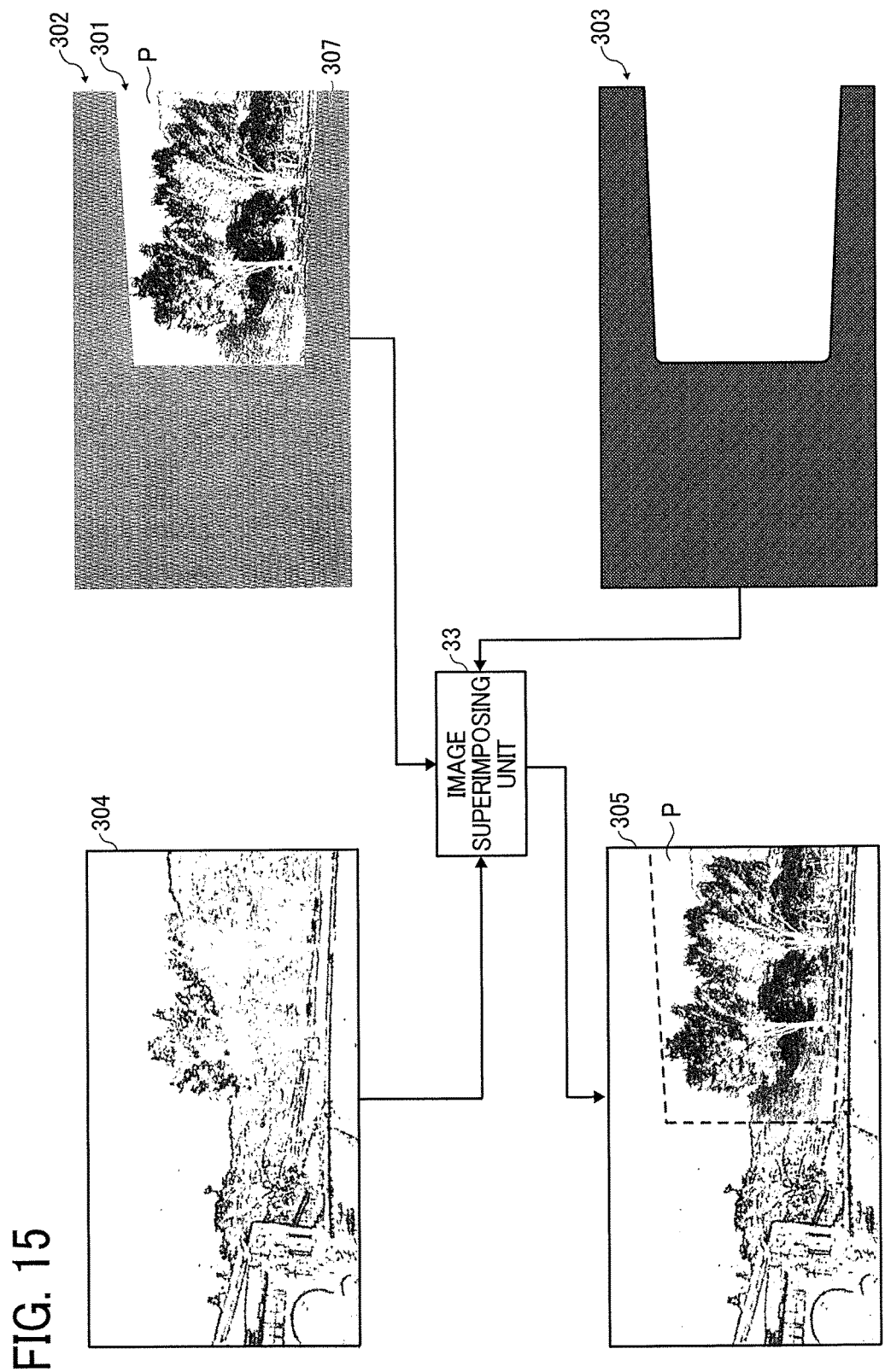

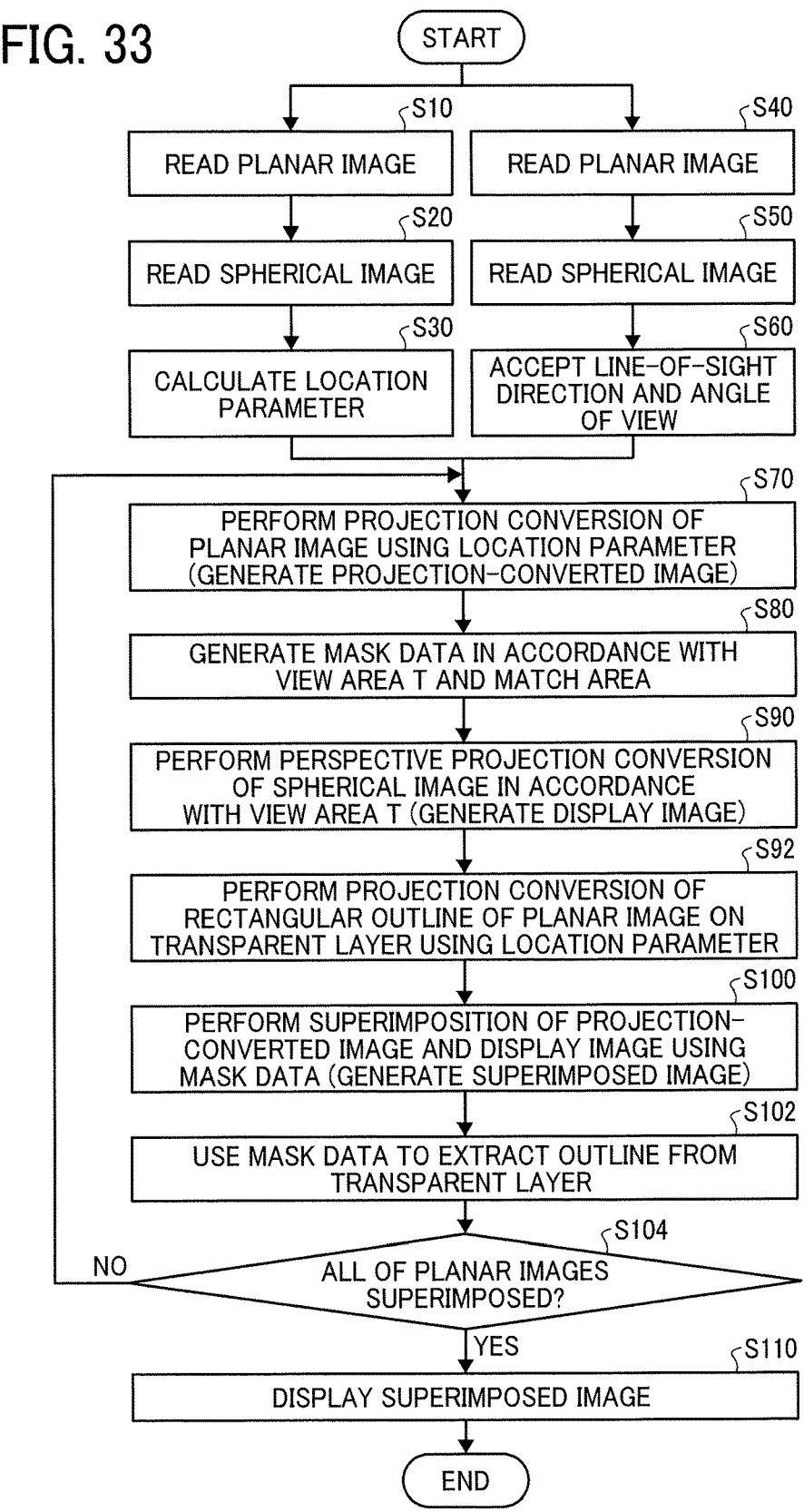

APPARATUS, SYSTEM, AND METHOD FOR CONTROLLING DISPLAY, AND RECORDING MEDIUM

CROSS-REFERENCE TO RELATED APPLICATIONS

This patent application is based on and claims priority pursuant to 35 U.S.C. § 119(a) to Japanese Patent Application No. 2016-256383, filed on Dec. 28, 2016 and Japanese Patent Application No. 2017-208675, filed on Oct. 27, 2017, in the Japan Patent Office, the entire disclosure of which is hereby incorporated by reference herein.

BACKGROUND

Technical Field

The present invention relates to an apparatus, system, and method of controlling display, and a recording medium.

Description of the Related Art

Image capturing devices capable of capturing wider-angle images than those captured by general-purpose (generic) digital cameras are widely used. For example, a spherical camera provided with a plurality of, for example, fish-eye lenses generates a spherical image of a 360-degree surrounding view captured with a single image capturing operation. A user can determine the line-of-sight direction as desired for the spherical image and view the spherical image in various directions.

However, taking into consideration an image processing load, image processing of a spherical image for a wide image capturing range is likely to be restricted. The image quality of a spherical image tends to be lower (for example, the resolution is lower, whiteout is more likely to occur, or color reproducibility is lower) than that of an image captured by the generic digital camera. Accordingly, in a case where a user enlarges a portion of a spherical image and views the spherical image, a decrease in the image quality may be unallowable to the user or the user may have difficulty in obtaining detailed information, which may be inconvenient to the user.

SUMMARY

Embodiments of the present invention include an apparatus, system, and method for controlling a display, each of which: controls the display to display an image of a predetermined area of a first image, the first image being superimposed with a second image; determines whether the second image is viewed by a user; and switches a display of the second image between a first display in which the second image is displayed as a still image and a second display in which the second image is displayed as a moving image, based on a determination result indicating whether the second image is viewed by the user.

BRIEF DESCRIPTION OF THE SEVERAL VIEWS OF THE DRAWINGS

A more complete appreciation of the disclosure and many of the attendant advantages and features thereof can be readily obtained and understood from the following detailed description with reference to the accompanying drawings, wherein:

FIGS. 7A to 7C are diagrams schematically illustrating example operation of generating a spherical image from images captured by the spherical camera;

FIGS. 13A to 13C are diagrams illustrating projection conversion of a planar image in a match area and an example of a location parameter for associating the planar image with the match area;

FIG. 15 is an example diagram schematically illustrating superimposition of a planar image on a spherical image;

FIG. 33 is a flowchart illustrating operation of displaying an outline of a planar image on a spherical image, performed by the display control apparatus, according to an embodiment.

Figure 1A:
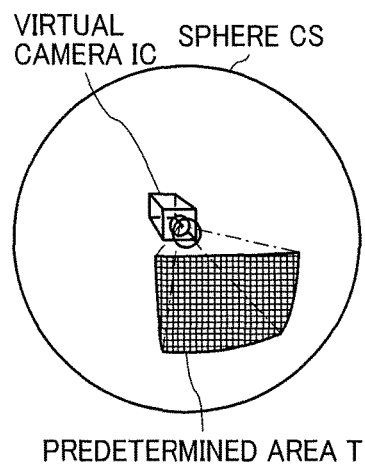
FIGS. 1A and 1B are example diagrams illustrating a spherical image.

The accompanying drawings are intended to depict embodiments of the present invention and should not be interpreted to limit the scope thereof. The accompanying drawings are not to be considered as drawn to scale unless explicitly noted.

DETAILED DESCRIPTION

The terminology used herein is for the purpose of describing particular embodiments only and is not intended to be limiting of the present invention. As used herein, the singular forms "a", "an" and "the" are intended to include the plural forms as well, unless the context clearly indicates otherwise.

In describing embodiments illustrated in the drawings, specific terminology is employed for the sake of clarity. However, the disclosure of this specification is not intended to be limited to the specific terminology so selected and it is to be understood that each specific element includes all technical equivalents that have a similar function, operate in a similar manner, and achieve a similar result.

Hereinafter, embodiments of the present invention will be described with reference to the drawings.

In this disclosure, a first image is an image superimposed with a second image, and a second image is an image to be superimposed on the first image. For example, the first image is an image covering an area larger than that of the second image. In another example, the first image and the second image are images expressed in different projections. In another example, the second image is an image with image quality higher than that of the first image, for example, in terms of image resolution. However, the definition of "high image quality" differs depending on the image, and therefore, may vary depending on the user's purpose of viewing. In general, "high image quality" means an image faithfully representing a scene. For example, "high image quality" means an image having a high resolution, a wide dynamic range, high color reproducibility, or less noise. Examples of the first image include a spherical image, an equirectangular projection image, and a low-definition image. Examples of the second image include a planar image, a perspective projection image, and a high-definition image.

Further, in this disclosure, the spherical image does not have to be the full-view spherical image. For example, the spherical image may be the wide-angle view image having an angle of about 180 to 360 degrees in the horizontal direction. As described below, it is desirable that the spherical image is image data having at least a part that is not entirely displayed in the predetermined area T.

First Embodiment

Overview of Spherical image

Figure 1B:
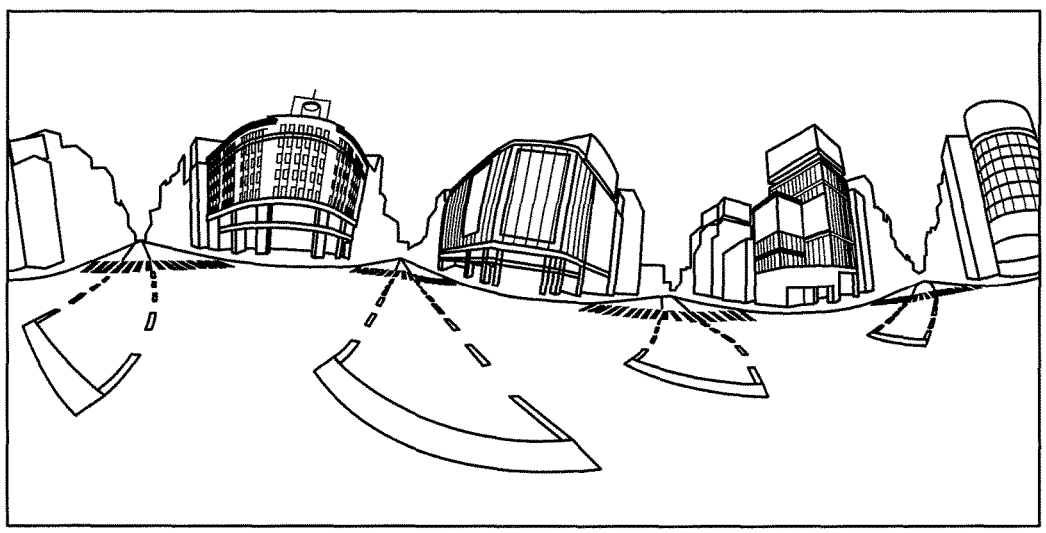

FIG. 1A illustrates a spherical image CE mapped on a virtual, three-dimensional (3D) sphere CS. FIG. 1B illustrates the equirectangular projection image CE. The spherical image CE generated by a spherical camera has a 3D form that is obtained by mapping the equirectangular projection image CE as illustrated in FIG. 1B on the sphere CS illustrated in FIG. 1A. The virtual camera IC corresponds to the point of view of a user. In FIG. 1A, the point of view is present at the center of the spherical image CE. When the user makes the virtual camera IC rotate about three axes, namely, an X axis, a Y axis, and a Z axis, that pass through the virtual camera IC, the user can display a predetermined area T, such as a view area T (an area on a display or an area displayed by display software), in the spherical image CE as desired. Further, the user can enlarge or reduce the view area T. In this disclosure, the predetermined area T is referred to as the view area T.

Overview of Display Control Apparatus

Figure 2A:
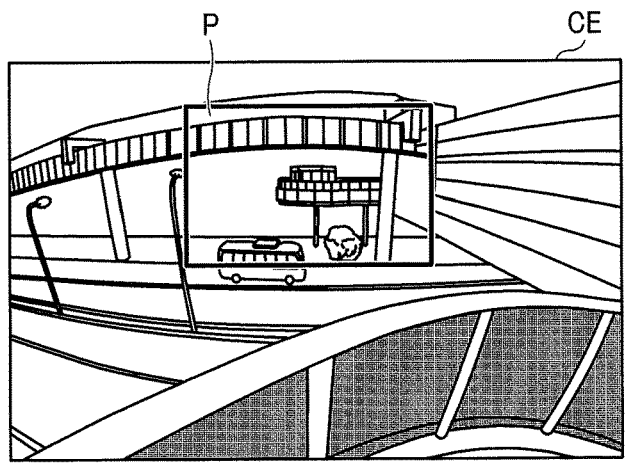
FIGS. 2A to 2C are example diagrams illustrating a display method for displaying a moving image superimposed on a spherical image.
Figure 2B:
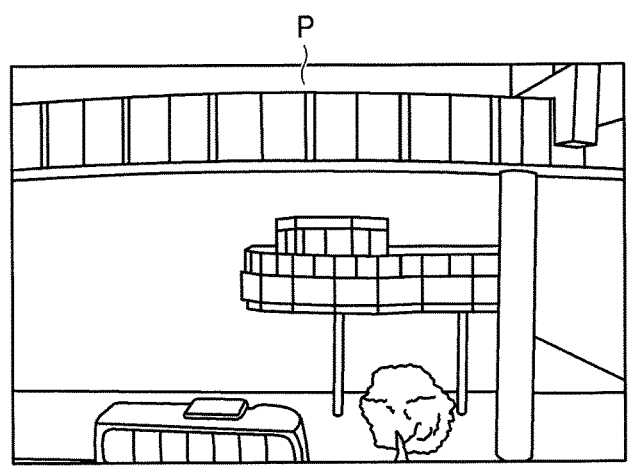
Figure 2C:
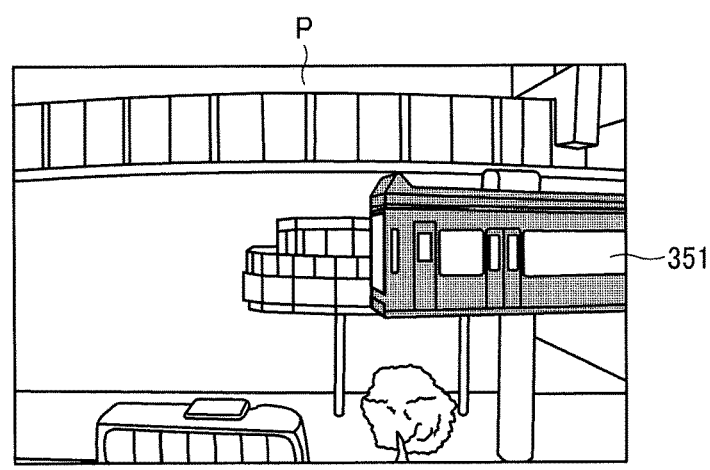

FIGS. 2A to 2C are example diagrams illustrating a display method for displaying a moving image superimposed on a spherical image. On the spherical image CE illustrated in FIG. 2A, a planar image P that is a moving image is superimposed. A user enlarges the spherical image CE in order to enlarge and view the planar image P as illustrated in FIG. 2A to FIG. 2B. The user may or may not be aware of the moving image. In order to make the user be aware of the moving image, the display control apparatus may indicate the presence of the planar image P (for example, display an outline described below). In this disclosure, the moving image means an active image obtained by successively displaying, at short intervals, a series of images (frames) captured at substantially regular intervals.

The user gradually enlarges the spherical image CE as illustrate in FIG. 2A to FIG. 2B. The planar image P illustrated in FIG. 2A corresponds to the entire planar image P illustrated in FIGS. 2B and 2C. As illustrated in FIG. 2B, when the user enlarges the spherical image CE to some extent, it is inferred that the user wants to view the planar image P, and the display control apparatus starts replaying the moving image. In FIG. 2C, the moving image in which a monorail train 351 is moving leftward from the right is displayed.

As described above, when it is inferred that the user views the planar image P, the moving image is replayed. Therefore, the moving image can be replayed in a case where the user wants to view the planar image P, and unwanted replay of the moving image can be suppressed. Further, the user can view the moving image from the beginning. If the moving image is replayed at all times, when the user starts viewing the moving image, the user is unable to know the time elapsed since the start of replay. Further, when the user enlarges the planar image P, replay of the moving image starts. Therefore, motion seems to start suddenly on the screen, which can attract the user's attention. In this disclosure, it is assumed that the second image is being viewed by the user, when there is an event that can be determined that the user is consciously looking at the second image.

Example System Configurations

Figure 3A:
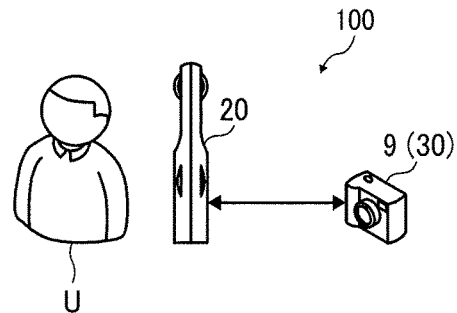
FIGS. 3A to 3C are diagrams illustrating example system configurations of an image processing system including a spherical camera and a display control apparatus.
Figure 3B:
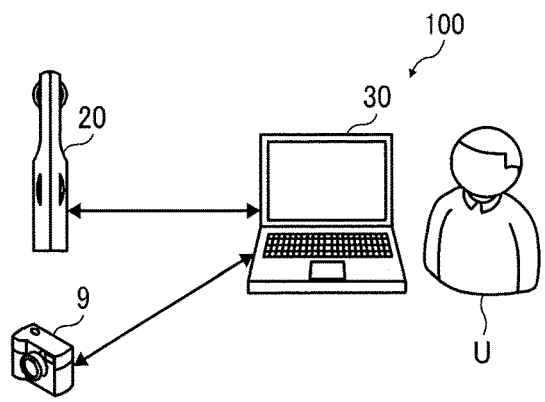
Figure 3C:
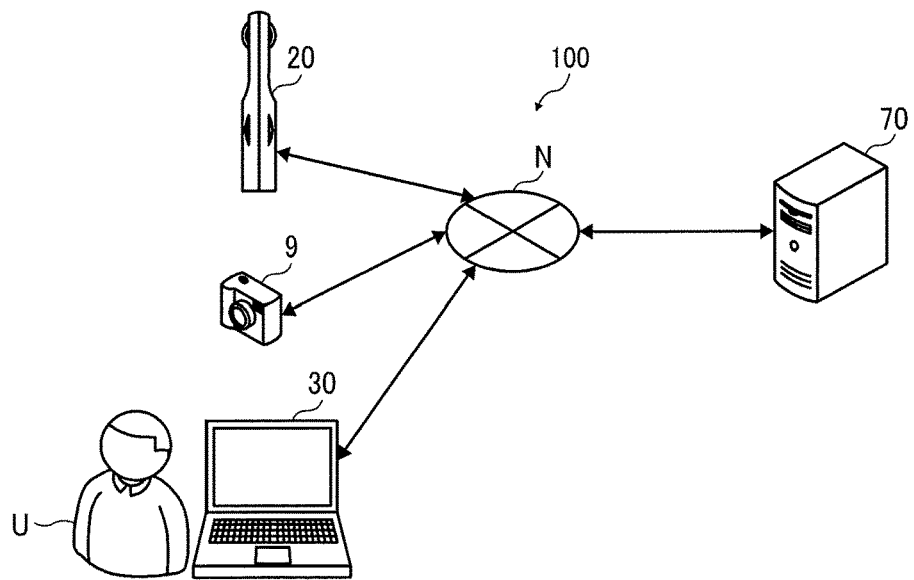

FIGS. 3A to 3C are diagrams illustrating example system configurations of an image processing system 100 including a spherical camera 20 and a display control apparatus 30.

FIG. 3A illustrates the image processing system 100 that includes the spherical camera 20 and a general-purpose (generic) digital camera 9. The generic digital camera 9 is typically an image capturing device (camera) that captures images with a focal length of 35 mm or more on a 35-mm-film basis and may be an image capturing device capable of capturing wide-angle images corresponding to about 24 mm to 35 mm. Simply speaking, the digital camera 9 is not the spherical camera 20 but an image capturing device that captures the planar image P. In other words, the digital camera 9 is an image capturing device capturing an image that can be entirely displayed in the view area T.

The digital camera 9 includes an imaging element having at least a resolution higher than that of the spherical image CE (having a large number of pixels relative to the angle of view for image capturing). Further, in the digital camera 9, image capturing conditions (for example, the exposure time, the shutter speed, and the white balance) are optimized for an image capturing range narrower than that of the spherical camera 20, and therefore, it is often the case that whiteout is less likely to occur, the color reproducibility is high, and less noise is produced. As described above, the digital camera 9 generates planar images of high image quality.

Accordingly, the spherical image CE, which is an image blurred when enlarged, can be complemented by the planar image P, which is an image of high image quality. In the configuration illustrated in FIG. 3A, the digital camera 9 also functions as the display control apparatus 30. Specific examples of the digital camera 9 include a digital still camera and a digital video camera. The digital camera 9 may be replaced by another device that includes an image capturing device. For example, the digital camera 9 may be replaced by a smartphone, a tablet terminal, a personal digital assistant (PDA), or a wearable personal computer (PC). In this case, the spherical camera 20 may be externally attached to, for example, the smartphone.

The spherical camera 20 and the digital camera 9 can communicate with each other using, for example, Universal Serial Bus (USB), Bluetooth (registered trademark), or a wireless local area network (LAN). The spherical image CE captured by the spherical camera 20 is transmitted to the digital camera 9. Similarly, the digital camera 9 captures the planar image P. In the spherical image CE, a 360-degree surrounding view is present, and therefore, the planar image P corresponds to a part of the spherical image CE.

The digital camera 9 functions as the display control apparatus 30 and superimposes the planar image P on the spherical image CE. Specifically, for example, a user U selects the planar image P and the spherical image CE and instructs the digital camera 9 to perform superimposition. Alternatively, the user U sets the digital camera 9 to a superimposition mode and captures the planar image P. Then, the digital camera 9 automatically superimposes the planar image P on the spherical image CE that matches the planar image P. If the degree of image matching is low, the digital camera 9 does not perform superimposition, which causes less inconvenience. Further, the digital camera 9 that functions as the display control apparatus 30 displays a moving image on the display of the digital camera 9 while switching between replay and stop of the moving image. As described above, in the case where the digital camera 9 functions as the display control apparatus 30, in the configuration constituted by the spherical camera 20 and the digital camera 9, the planar image P can be superimposed on the spherical image CE, and switching between replay and stop of the moving image can be performed.

FIG. 3B illustrates the image processing system 100 that includes the spherical camera 20, the generic digital camera 9, and the display control apparatus 30. The spherical camera 20 and the display control apparatus 30 can communicate with each other using, for example, USB, Bluetooth (registered trademark), or a wireless LAN, and the digital camera 9 and the display control apparatus 30 can communicate with each other using, for example, USB, Bluetooth (registered trademark), or a wireless LAN. One or more spherical images CE captured by the spherical camera 20 are transmitted to the display control apparatus 30. One or more planar images P captured by the digital camera 9 are also transmitted to the display control apparatus 30. Instead of transmission, the spherical images CE or the planar images P stored in a storage medium may be read by the display control apparatus 30 from the storage medium.

The display control apparatus 30 is an information processing apparatus, such as a PC, a smartphone, a tablet terminal, or a PDA. Alternatively, the display control apparatus 30 may be a multifunction peripheral, a projector, or a video conference terminal having functions of an information processing apparatus.

In the configuration illustrated in FIG. 3B, the display control apparatus 30 superimposes at least one of the planar images P on one of the spherical images CE. The display control apparatus 30 displays a moving image on the display of the display control apparatus 30 while switching between replay and stop of the moving image. More specifically, in the case of superimposing one planar image P on the spherical image CE, the user U compares the planar images P and the spherical images CE and knows which planar image P constitutes part of which spherical image CE. Then, the user U selects one of the spherical images CE and the planar image P that is to be placed on the spherical image CE, and instructs the display control apparatus 30 to perform placement. Similarly to the digital camera 9, the display control apparatus 30 may automatically perform superimposition. As described above, the display control apparatus 30 can obtain the spherical image CE and the planar image P, superimpose the planar image P on the spherical image CE, and switch between replay and stop of the moving image. The description of FIG. 4 and subsequent figures is given while assuming the configuration illustrated in FIG. 3B unless otherwise specified.

FIG. 3C illustrates the image processing system 100 in which the spherical camera 20, the generic digital camera 9, the display control apparatus 30, and an image processing server 70 are connected to one another via a network N. The network N is formed of, for example, a LAN formed in the user U's environment, a provider network of a provider that connects the LAN to the Internet, and a line provided by a carrier. In a case where the network N includes a plurality of LANs, the network N is called a wide area network (WAN) or the Internet. The network N may be formed of wired or wireless networks or may be formed of a combination of wired and wireless networks. In a case where the spherical camera 20 and the digital camera 9 are directly connected to a public line network, the spherical camera 20 and the digital camera 9 can be connected to the provider network without using the LAN.

The image processing server 70 may be a general information processing apparatus or a server apparatus. Specific examples of the display control apparatus 30 illustrated in FIG. 3C may be similar to the specific examples of the display control apparatus 30 illustrated in FIG. 3B. It is preferable that the image processing server 70 support cloud computing. Cloud computing is a use form in which a user uses resources in a network without awareness of a specific hardware resource.

One or more spherical images CE captured by the spherical camera 20 are transmitted to the image processing server 70. One or more planar images P captured by the digital camera 9 are also transmitted to the image processing server 70. In the configuration illustrated in FIG. 3C, the image processing server 70 superimposes at least one of the planar images P on one of the spherical images CE. More specifically, the display control apparatus 30 accesses the image processing server 70 in response to an operation by the user U and displays a list of the spherical images CE and a list of the planar images P (for example, thumbnail images). For example, in the case of superimposing one planar image P on the spherical image CE, the user U compares the planar images P and the spherical images CE and knows which planar image P constitutes part of which spherical image CE. Then, the user U selects one of the spherical images CE and the planar image P that is to be placed on the spherical image CE, and transmits the selected spherical image CE and planar image P to the image processing server 70. The image processing server 70 may automatically perform superimposition.

The image processing server 70 superimposes the planar image P on the spherical image CE and transmits image data of the view area T to the display control apparatus 30. It is assumed that the line-of-sight direction and the angle of view in the initial state are determined in advance. The image processing server 70, which functions as a Web server, transmits image data of the view area T and a display program (described in a script language) for accepting an operation performed by the user U to the display control apparatus 30. The display control apparatus 30 executes the display program to accept an operation performed by the user U and transmits the line-of-sight direction and the angle of view to the image processing server 70. The image processing server 70 updates the view area T in accordance with the line-of-sight direction and the angle of view and transmits image data of the view area T to the display control apparatus 30. The image processing server 70 switches between replay and stop of a moving image, and therefore, the display control apparatus 30 can display an image in which a moving image is replayed and an image in which a moving image is not replayed.

The image processing server 70 may transmit the spherical image CE, the planar image P, and the display program to the display control apparatus 30. In this case, the display control apparatus 30 determines the view area T in accordance with an operation performed by the user U and switches between replay and stop of a moving image.

The image processing server 70 may calculate a location parameter (described below) from the spherical image CE and the planar image P, and the display control apparatus 30 may download the spherical image CE, the planar image P, and the location parameter. Although the user changes the line-of-sight direction as desired, the display control apparatus 30 can superimpose the planar image P on the spherical image CE by using the same location parameter. In this case, the image processing server 70 includes a location parameter generator 8 illustrated in FIG. 12 described below, and the display control apparatus 30 includes a conversion/display unit 7 illustrated in FIG. 12.

Hardware Configuration

Hardware Configuration of Spherical Camera

Figure 4:
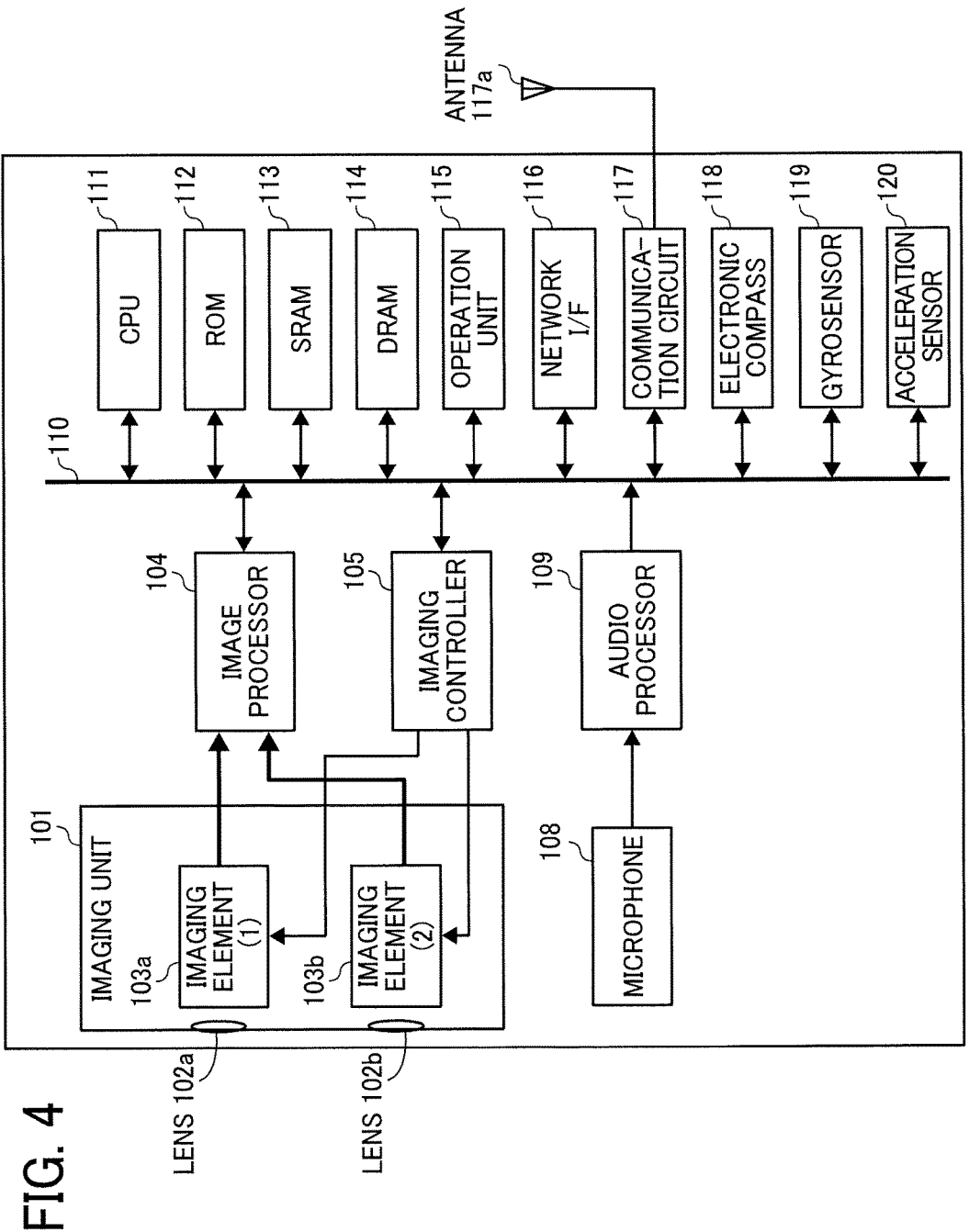
FIG. 4 is a schematic diagram illustrating a hardware configuration of the spherical camera, according to an embodiment.

FIG. 4 is a hardware configuration diagram of the spherical camera 20. It is assumed hereinafter that the spherical camera 20 is an omnidirectional image capturing device including two imaging elements; however, the number of imaging elements may be three or more. Further, the spherical camera 20 need not be a device dedicated to omnidirectional image capturing. For example, an omnidirectional image capturing unit may be attached to, for example, the generic digital camera 9 or a smartphone to thereby implement substantially the same functions as those of the spherical camera 20.

As illustrated in FIG. 4, the spherical camera 20 includes an imaging unit 101, an image processor 104, an imaging controller 105, a microphone 108, an audio processor 109, a central processing unit (CPU) 111, a read-only memory (ROM) 112, a static random access memory (SRAM) 113, a dynamic random access memory (DRAM) 114, an operation unit 115, a network interface (I/F) 116, a communication circuit 117, an antenna 117*a*, an electronic compass 118, a gyro sensor 119, and an acceleration sensor 120.

Among these constituent elements, the imaging unit 101 includes wide-angle lenses (fish-eye lenses) 102*a* and 102*b* each having an angle of view of 180° or more so as to form a hemispherical image and two imaging elements 103*a* and 103*b* corresponding to the wide-angle lenses 102*a* and 102*b* respectively. The imaging elements 103*a* and 103*b* each include an image sensor, such as a complementary metal oxide semiconductor (CMOS) sensor or a charge coupled device (CCD) sensor, that converts an optical image captured by the fish-eye lens to an electric signal and outputs image data, a timing generation circuit that generates, for example, a horizontal or vertical synchronization signal and a pixel clock for the image sensor, and a group of registers in which, for example, various commands and parameters used in an operation of the imaging element are set.

The imaging elements 103*a* and 103*b* of the imaging unit 101 are each connected to the image processor 104 via a parallel I/F bus. Further, the imaging elements 103*a* and 103*b* of the imaging unit 101 are each connected to the imaging controller 105 via a serial I/F bus (for example, an I2C bus). The image processor 104 and the imaging controller 105 are connected to the CPU 111 via a bus 110. Furthermore, for example, the ROM 112, the SRAM 113, the DRAM 114, the operation unit 115, the network I/F 116, the communication circuit 117, and the electronic compass 118 are connected to the bus 110.

The image processor 104 acquires pieces of image data output from the respective imaging elements 103*a* and 103*b* via the parallel I/F buses, performs a predetermined process for the pieces of image data, and performs a superimposition process for the pieces of image data to generate data of an image in equirectangular projection as illustrated in FIG. 1B.

In general, the imaging controller 105 functions as a master device, and the imaging elements 103*a* and 103*b* function as slave devices. Then, the imaging controller 105 uses the I2C buses to set commands and so on in the group of registers of each of the imaging elements 103*a* and 103*b*. The commands and so on that are set are received from the CPU 111. Furthermore, the imaging controller 105 also uses the I2C buses to acquire status data and so on of the group of registers of each of the imaging elements 103*a* and 103*b* and transmits the status data and so on to the CPU 111.

The imaging controller 105 instructs the imaging elements 103*a* and 103*b* to output image data at the timing at which the shutter button of the operation unit 115 is pressed. The spherical camera 20 may have a preview display function using a display or a function of enabling moving image display. In the case of moving image display, pieces of image data are output from the imaging elements 103a and 103b successively at a predetermined frame rate (frames per minute).

The imaging controller 105 also functions as a synchronization controller that cooperates with the CPU 111 to synchronize the timings at which piece of image data are output from the imaging elements 103a and 103b, as described below. Although the spherical camera 20 does not include a display in this embodiment, the spherical camera 20 may include a display.

The microphone 108 converts sounds to audio data (signal). The audio processor 109 acquires the audio data output from the microphone 108 via an I/F bus and performs a predetermined process for the audio data.

The CPU 111 controls the entire operation of the spherical camera 20 and performs processing as appropriate. The ROM 112 stores various programs for the CPU 111. The SRAM 113 and the DRAM 114 are work memories and store, for example, programs to be executed by the CPU 111 and data that is being processed. Specifically, the DRAM 114 stores image data that is being processed by the image processor 104 and data of an image in equirectangular projection that has been processed.

The operation unit 115 generally refers to various operation buttons, a power switch, the shutter button, and a touch panel having both display and operation functions. The user U operates the operation buttons to input various image capturing modes and image capturing conditions.

The network I/F 116 generally refers to interface circuits (including a USB I/F) providing interfaces with, for example, an external medium, such as an SD card, and a PC. The network I/F 116 may function as a wireless or a wired network interface. Data of an image in equirectangular projection stored in the DRAM 114 is recorded to an external medium via the network IN 116 or transmitted to an external device, such as the display control apparatus 30, via the network I/F 116, which functions as a network interface as appropriate.

The communication circuit 117 communicates with an external device, such as the display control apparatus 30, via the antenna 117a included in the spherical camera 20 by using a short-range wireless technology, such as Wireless Fidelity (Wi-Fi) or the near-field communication (NFC). Data of an image in equirectangular projection can be transmitted to an external device, such as the display control apparatus 30, also via the communication circuit 117.

The electronic compass 118 calculates the azimuth of the spherical camera 20 from the magnetism of the earth and outputs azimuth information. The azimuth information is an example of related information (metadata) compliant with Exchangeable image file format (Exif) and used in image processing, such as image correction of a captured image. The related information also includes other data, such as the date and time when the image is captured and the size of the image data.

The gyro sensor 119 detects changes in angles (roll, pitch, and yaw angles) associated with a tilt of the spherical camera 20. The changes in the angles are examples of the related data (metadata) compliant with Exif and used in image processing, such as image correction of a captured image.

The acceleration sensor 120 detects accelerations in the directions of three axes. On the basis of the detected accelerations, the attitude of the spherical camera 20 (the angle relative to the gravity direction) is detected. Both the gyro sensor 119 and the acceleration sensor 120 are provided to thereby increase the accuracy of image correction.

It is assumed that the hardware configuration of the digital camera 9 is similar to that of the spherical camera 20 illustrated in FIG. 4. However, the imaging unit may be different from that of the digital camera 9. The imaging unit of the digital camera 9 may include a lens unit having a plurality of lenses, a mechanical shutter button, and an imaging element.

Hardware Configuration of Display Control Apparatus

Figure 5:
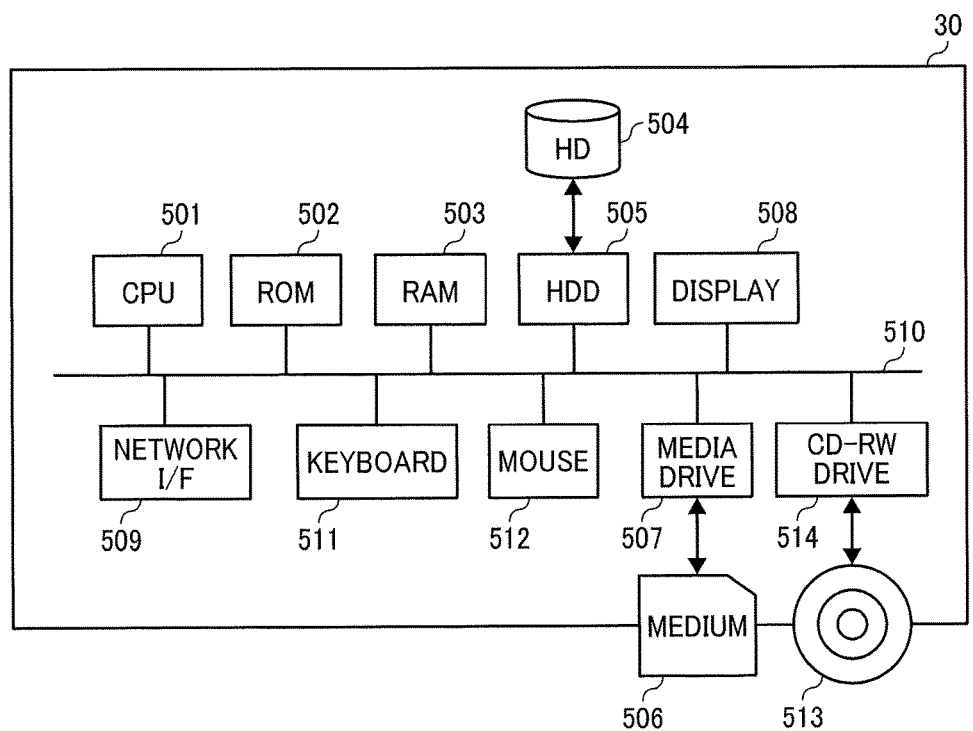
FIG. 5 is a schematic diagram illustrating a hardware configuration of the display control apparatus, according to an embodiment.

FIG. 5 is a hardware configuration diagram of the display control apparatus 30. The display control apparatus 30 includes a CPU 501, which controls the entire operation of the display control apparatus 30, a ROM 502, which stores programs including an initial program loader (IPL) that are used to drive the CPU 501, a RAM 503, which is used as a work area of the CPU 501, and a hard disk (HD) 504, which stores various types of data including a display control apparatus program. The display control apparatus 30 further includes a hard disk drive (HDD) 505, which controls reading/writing of various types of data from/to the HD 504 in accordance with control by the CPU 501, and a medium drive (media drive) 507, which controls reading/writing (storing) of data from/to (in) a recording medium 506, which is, for example, a flash memory. The display control apparatus 30 further includes a display 508, which displays various types of information, such as cursors, menus, windows, text, and images, a network I/F 509, which is used to perform data communication using the network N, a keyboard 511, which includes a plurality of keys for inputting characters, numbers, and various instructions, and a mouse 512, which is used to, for example, select and execute various instructions, select a processing target, and move a cursor. The display control apparatus 30 further includes an optical medium drive (such as CD-RW drive) 514, which controls reading/writing of various types of data from/to an optical recording medium 513, which is an example of an attachable/detachable recording medium, and a bus line 510, which is constituted by, for example, an address bus and a data bus used to electrically connect the above-described constituent elements, as illustrated in FIG. 5.

It is assumed that the hardware configuration of the image processing server 70 is similar to that illustrated in FIG. 5.

Generation of Spherical Image CE

Figure 6:
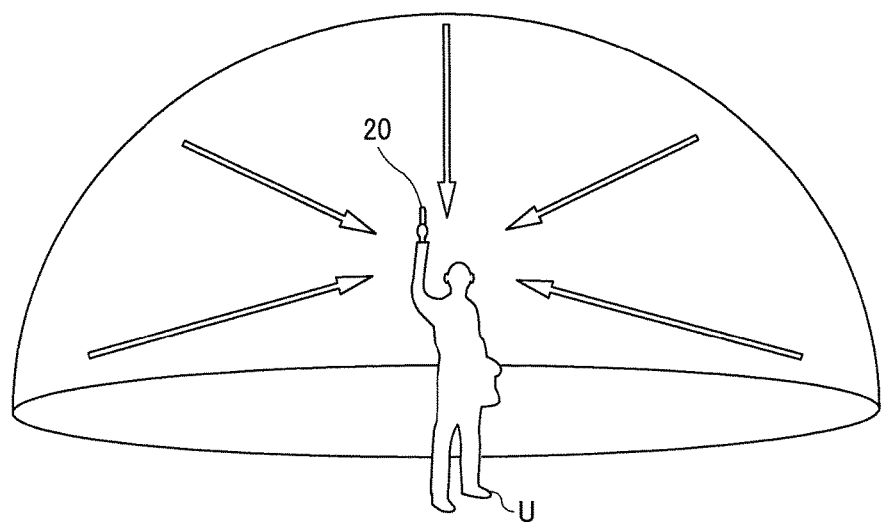
FIG. 6 is a conceptual diagram illustrating example use of the spherical camera.

The spherical image CE is described with reference to FIG. 6 to FIG. 10. FIG. 6 is a conceptual diagram illustrating use of the spherical camera 20. As illustrated in FIG. 6, the user U holds the spherical camera 20 in their hand and uses the spherical camera 20 to capture images of objects around the user U. The spherical camera 20 includes the two imaging elements that are arranged such that the back surfaces thereof face each other. Each of the two imaging elements captures an image of objects around the user U to thereby obtain two hemispherical images.

Now, the overview of processing up to generation of the spherical image CE from images captured by the spherical camera 20 is described with reference to FIG. 7A to FIG. 9B. FIG. 7A is a diagram illustrating a hemispherical image (front side) captured by the spherical camera 20, FIG. 7B is a diagram illustrating a hemispherical image (back side) captured by the spherical camera 20, and FIG. 7C is a diagram illustrating a spherical image in equirectangular projection. FIG. 8A is a diagram schematically illustrating a state where a sphere is covered by an image in equirectangular projection, and FIG. 8B is a diagram illustrating the spherical image CE.

As illustrated in FIG. 7A, an image captured by the spherical camera 20 is a hemispherical image (front side) that curves due to the fish-eye lens. As illustrated in FIG. 7B, an image captured by the spherical camera 20 is a hemispherical image (back side) that curves due to the fish-eye lens. The hemispherical image (front side) and the hemispherical image (back side), which is flipped by 180 degrees, are combined by the spherical camera 20, and an image in equirectangular projection is generated accordingly, as illustrated in FIG. 7C.

Figure 8B:
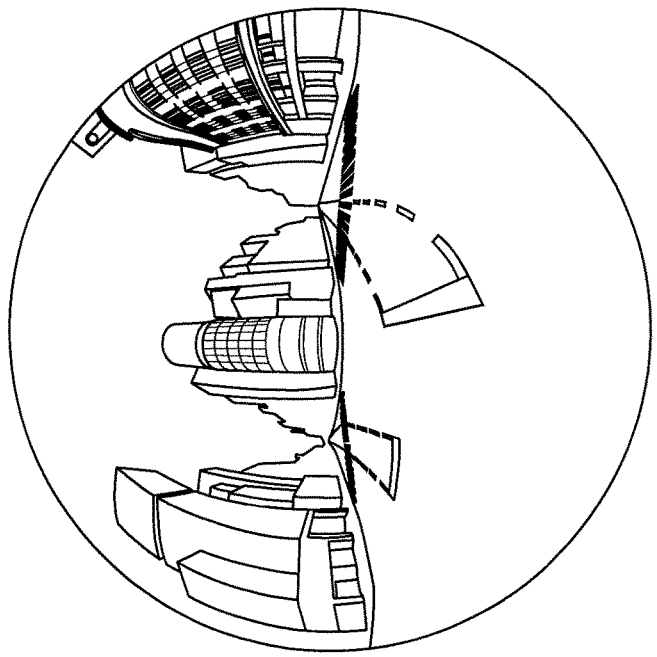
FIGS. 8A and 8B are diagrams schematically illustrating example operation of generating a spherical image from images captured by the spherical camera.
Figure 8A:
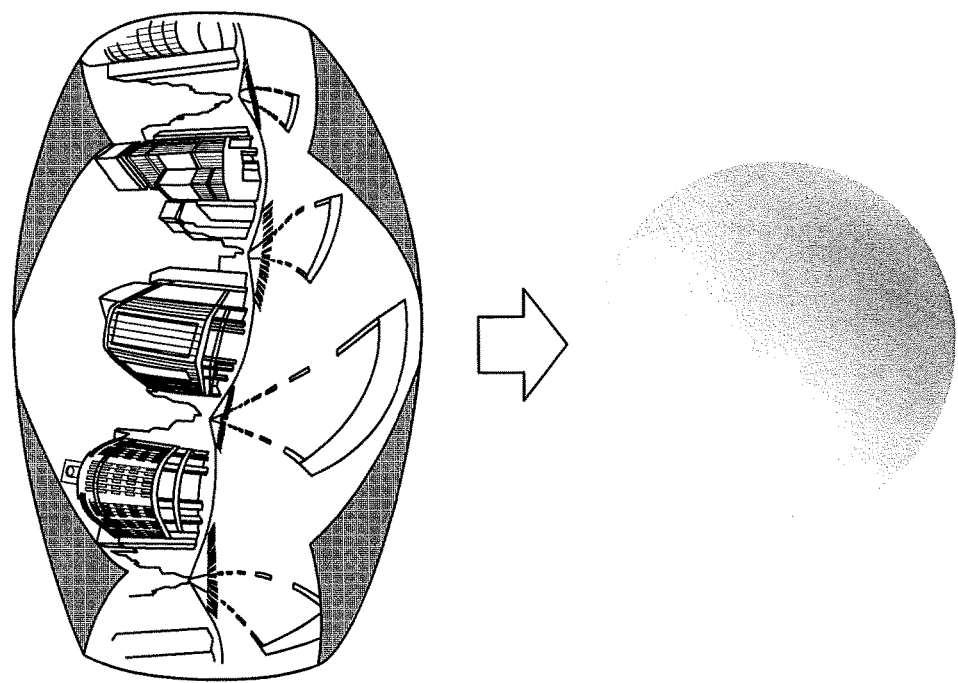

Then, the image in equirectangular projection is placed so as to cover the spherical surface, as illustrated in FIG. 8A, by using Open Graphics Library for Embedded Systems (OpenGL ES), and the spherical image CE as illustrated in FIG. 8B is generated. Accordingly, the spherical image CE is represented as an image in equirectangular projection that faces the center of the sphere. Note that OpenGL ES is a graphics library that is used to visualize two-dimensional (2D) and 3D data. The spherical image CE may be a still image or a moving image. Specifically, the image in equirectangular projection illustrated in FIG. 8A is converted to the 3D spherical image illustrated in FIG. 8B by using expressions (1) described with reference to FIGS. 9A and 9B.

Figure 9A:
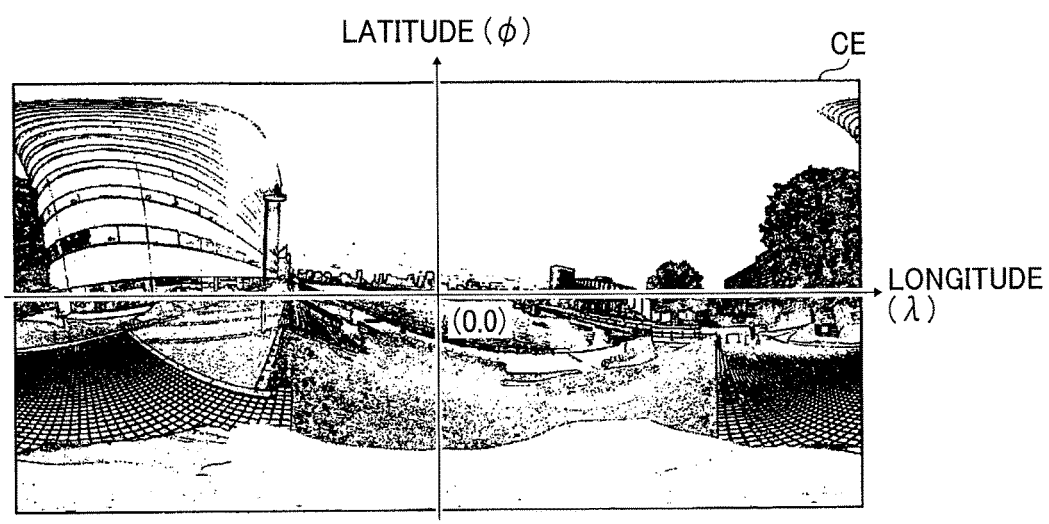
FIGS. 9A and 9B are example diagrams illustrating placement of a spherical image on a sphere in equirectangular projection.
Figure 9B:
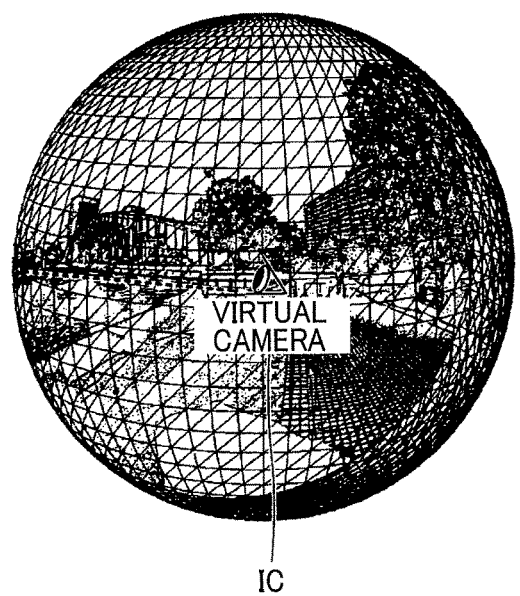

FIG. 9A is a diagram illustrating the spherical image CE in equirectangular projection, and FIG. 9B illustrates the spherical image CE that is obtained by placing the spherical image CE in equirectangular projection on a full sphere. Conversion from the image illustrated in FIG. 9A to the image illustrated in FIG. 9B is a process that is performed by the spherical camera 20 illustrated in FIG. 1 at the time when the spherical camera 20 performs image capturing.

The coordinates of a point (x, y, z) in a 3D space corresponding to a point (λ, φ) in equirectangular projection can be calculated by using the following expression. Here, the radius of the sphere is equal to 1.0.

$$x = \cos(\varphi) * \cos(\lambda)$$

$$y = \sin(\varphi)$$

$$z = \cos(\varphi) * \sin(\lambda) \quad (1)$$

Accordingly, the spherical image CE that is a 3D image is obtained from the spherical image CE in equirectangular projection. The spherical image CE is an image placed so as to cover the spherical surface and is curved. Accordingly, the spherical image CE may feel unnatural to a person who views the image. The display control apparatus 30 displays the planar image P that curves to a small degree in the view area T, which is part of the spherical image CE, so that the image does not feel unnatural to the person. The view area T is represented by coordinates (x, y, z) in a 3D virtual space. However, the display 508 is a 2D plane, and therefore, the display control apparatus 30 is unable to display the view area T as is.

Accordingly, the display control apparatus 30 performs perspective projection conversion in which a 3D object is projected onto a 2D plane by using a 3D computer graphics technique to thereby obtain an image that curves to a smaller degree. As a consequence, the view area T of the spherical image CE is displayed on the display 508.

Figure 10:
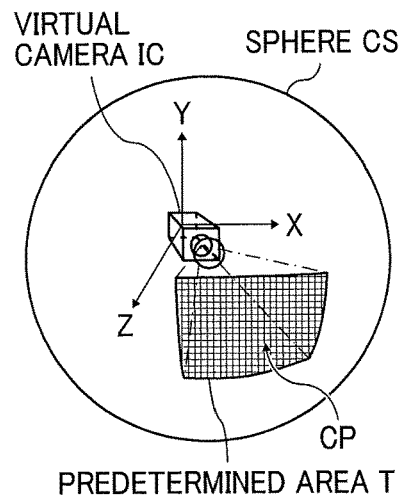
FIG. 10 is an example diagram illustrating the line of sight of a user.

FIG. 10 is an example diagram illustrating the line of sight of the user U. The spherical image CE has a 3D coordinate system, and therefore, the line-of-sight direction is identified by using information, such as 3D coordinates or a latitude and longitude, for identifying a position on the sphere. In this embodiment, the center cp of the view area T is assumed to correspond to the line-of-sight direction.

The user U can change the line-of-sight direction using the keyboard 511 or the mouse 512. If it is assumed that the virtual camera IC does not allow translation, the virtual camera IC allows three types of rotation, namely, roll (rotation about the Z axis), yaw (rotation about the Y axis), and pitch (rotation about the X axis). When any of the three types of rotation occurs, the line-of-sight direction changes. For example, when the user U rotates the spherical image CE in the horizontal direction, the yaw angle changes. When the user U rotates the spherical image CE in the vertical direction, the pitch angle changes. When the user U rotates the spherical image CE about an axis that passes through the center of the display 508, the roll angle changes. In this embodiment, an operation performed by the user U on a Web page is reflected to, for example, the line-of-sight direction (the roll angle, the yaw angle, and the pitch angle). The way of reflection is described in advance in a program that is executed by the display control apparatus 30.

Figure 11A:
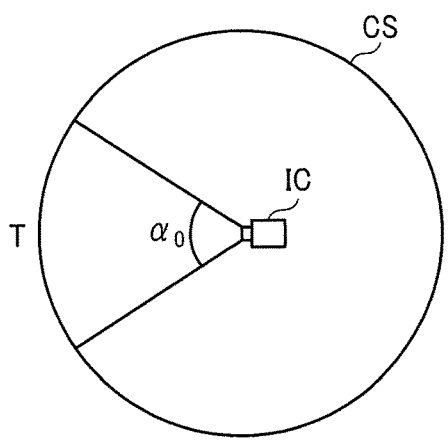
FIGS. 11A to 11D are example diagrams schematically illustrating enlargement and reduction of a view area in a spherical image.

FIGS. 11A to 11D are example diagrams schematically illustrating enlargement and reduction of the view area T in the spherical image CE. FIG. 11A illustrates the view area T in the initial state. In a case where the virtual camera IC is present at the center of the sphere CS, the view area T is determined in accordance with the angle of view α. The angle of view α is an angle that is determined when, for example, diagonally opposite vertexes of the view area T are viewed from the center of the sphere CS.

Figure 11B:
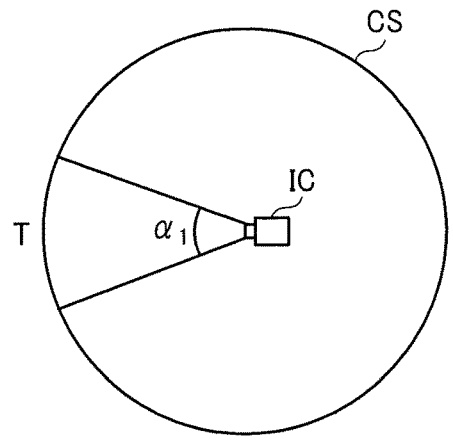
Figure 11C:
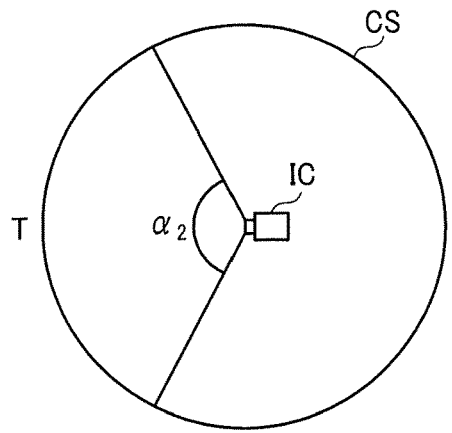

The angle of view α in the initial state is represented by $\alpha_0$. As illustrated in FIG. 11B, as the angle of view decreases ($\alpha_1 < \alpha_0$), the view area T becomes narrower, and the image is enlarged on the display 508 accordingly. As illustrated in FIG. 11C, as the angle of view increases ($\alpha_2 > \alpha_0$), the view area T becomes wider, and the image is reduced on the display 508 accordingly. When the user U performs an operation for enlarging or reducing the spherical image CE, the display control apparatus 30 decreases or increases the angle of view in accordance with the amount of operation.

Figure 11D:
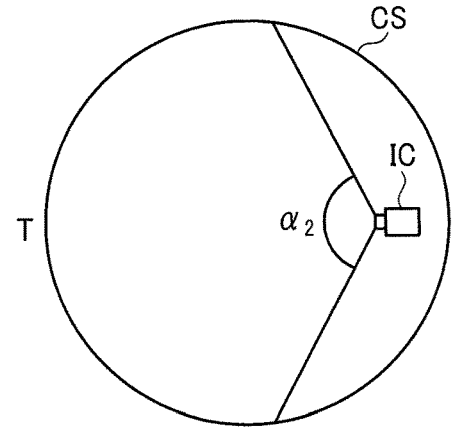

Even if the angle of view increases, as illustrated in FIG. 11C, the display control apparatus 30 is unable to display an image behind the virtual camera IC as long as the virtual camera IC is present at the center. Accordingly, when the user U performs an operation for further reduction in the state illustrated in FIG. 11C, the display control apparatus 30 moves the virtual camera IC backward. In FIG. 11D, the angle of view $\alpha_2$ remains the same as that in FIG. 11C; however, the virtual camera IC moves backward, and the view area T further becomes wider accordingly. As a consequence, the image can be reduced further than that in FIG. 11C.

Functions Related to Superimposition of Planar Image P on Spherical Image CE

Now, functions related to superimposition of the planar image P on the spherical image CE are described with reference to FIG. 12 to FIG. 17. As described above, the following description is given on the basis of the configuration illustrated in FIG. 3B.

Figure 12:
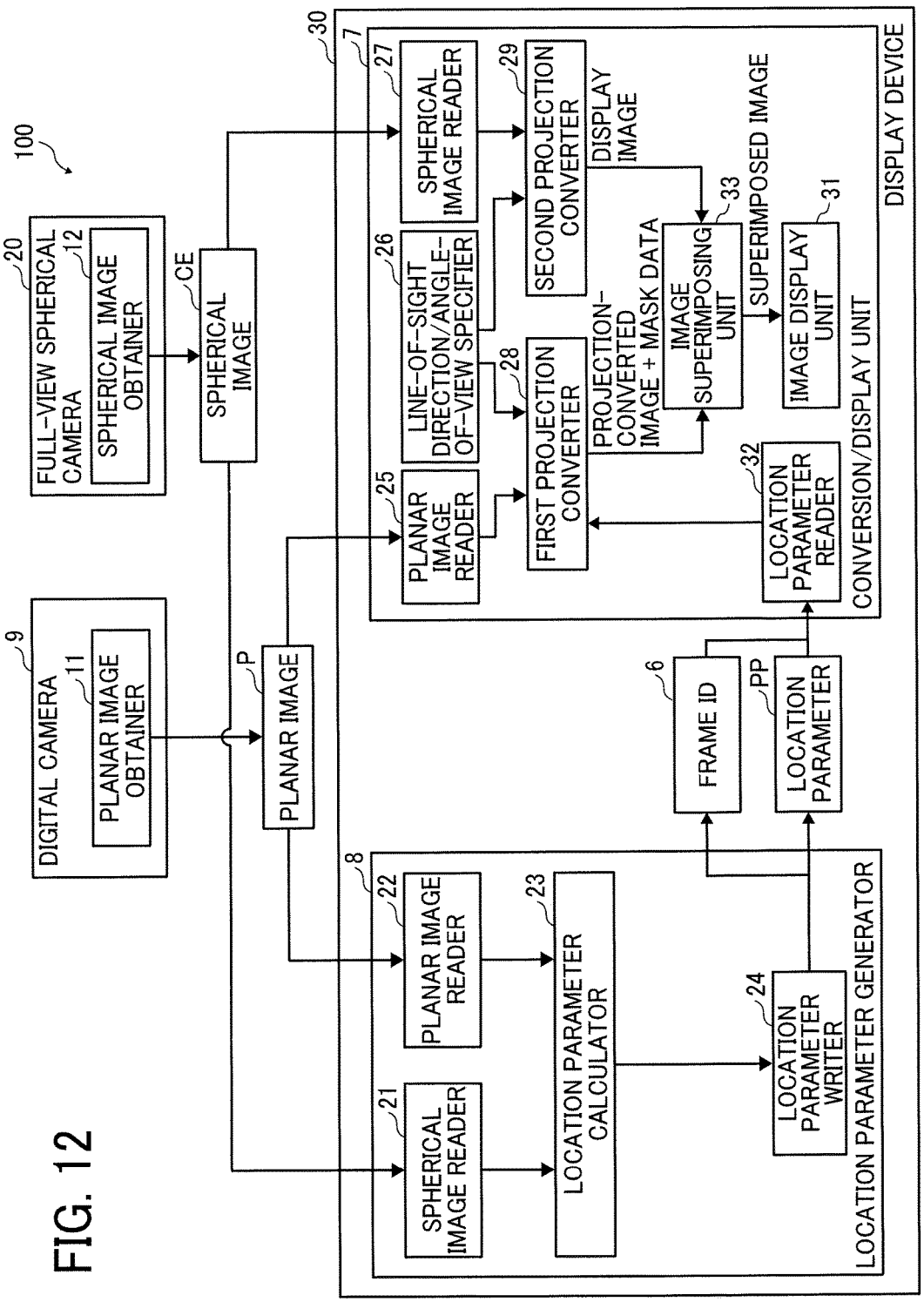
FIG. 12 is a schematic block diagram illustrating a functional configuration of a digital camera, the spherical camera, and the display control apparatus, according to an embodiment.

FIG. 12 is an example functional block diagram illustrating functions of the digital camera 9, the spherical camera 20, and the display control apparatus 30 as blocks. The digital camera 9 includes a planar image obtainer 11. The planar image obtainer 11 is implemented as an image capturing function of the digital camera 9 and generates image data (planar image P) in which each of the pixels according to a predetermined resolution represents gradation. The planar image P may include a single still image, a plurality of still images, or a moving image. In this embodiment, it is assumed that the planar image P is a moving image unless otherwise specified.

The spherical camera 20 includes a spherical image obtainer 12. The spherical image obtainer 12 is implemented as an image capturing function of the spherical camera 20 and generates image data (spherical image CE) of a 360-degree view around the spherical camera 20. The spherical image CE may include a single still image, a plurality of still images, or a moving image. In this embodiment, it is assumed that the spherical image CE is a still image unless otherwise specified.

The display control apparatus 30 mainly includes the location parameter generator 8 and the conversion/display unit 7. The functions of the location parameter generator 8 and the conversion/display unit 7 included in the display control apparatus 30 are functions or units implemented by the CPU 501 of the display control apparatus 30 illustrated in FIG. 5 executing a program loaded to the RAM 503 from the HD 504.

The location parameter generator 8 includes a spherical image reader 21, a planar image reader 22, a location parameter calculator 23, and a location parameter writer 24. The spherical image reader 21 reads the spherical image CE from the spherical image obtainer 12. The planar image reader 22 reads the planar image P from the planar image obtainer 11. The term "read" means to obtain, receive, read from a storage medium, or accept input.

The location parameter calculator 23 identifies a match area in the spherical image CE that matches the planar image P, and calculates a location parameter PP for identifying the match area. The details of the location parameter PP are described with reference to FIGS. 13A to 13C. The spherical image CE is distorted due to equirectangular projection, and therefore, it is preferable to perform similar conversion for the planar image P to make the planar image P distorted. Then, features points in both the spherical image CE and the planar image P are extracted and matched to thereby obtain the location parameter PP. For detection of feature points, various methods using, for example, edge detection, corner detection, Scale-Invariant Feature Transform (SIFT) feature values or Speeded-Up Robust Features (SURF) feature values, or a center point of the same continuous color are available. Alternatively, the sum of the absolute values of the differences between pixel values of the spherical image CE and the pixel values of the planar image P or the square sum of the differences is calculated while the target pixels are shifted by one pixel each time the calculation is performed, and the position of the planar image P when the sum of the absolute values or the square sum is minimized may be regarded as the match area.

In this embodiment, the spherical image CE is a still image, and the planar image P is a moving image, and therefore, only a frame (a still image included in the moving image) at a specific time matches the spherical image CE. The location parameter calculator 23 determines whether each of the frames of the planar image P matches the spherical image CE sequentially from the first frame. Then, a frame for which the matching degree is equal to or larger than a threshold is used to calculate the location parameter PP. Alternatively, the user U may communicate the matching frame to the display control apparatus 30. The location parameter writer 24 transmits the frame identification (ID) 6 of the frame that matches the spherical image CE to the conversion/display unit 7. Note that the term "ID" means an identifier or identification information. The ID is a name, a code, a character string, a numerical value, or any combination thereof used to uniquely distinguish a specific target from the others. The same applies to any ID other than the frame ID.

When the planar image P is divided in to mesh-like areas and it is determined whether each of the areas matches the spherical image CE, a shift due to, for example, a distortion in a lens can be additionally corrected.

The correspondence between the spherical image CE and the planar image P can be uniquely determined, and therefore, the location parameter PP needs to be calculated once. In a case where the planar image reader 22 reads a plurality of planar images P, the location parameter calculator 23 calculates the location parameter PP for each of the planar images P.

The conversion/display unit 7 includes a planar image reader 25, a line-of-sight direction/angle-of-view specifier 26, a spherical image reader 27, a first projection converter 28, a second projection converter 29, an image superimposing unit 33, a location parameter reader 32, and an image display unit 31. The functions of the spherical image reader 27 are the same as the functions of the spherical image reader 21 of the location parameter generator 8. The location parameter reader 32 obtains the location parameter PP and the frame ID from the location parameter generator 8.

The planar image reader 25 reads each frame of the planar image P. The planar image reader 25 reads a frame having the frame ID specified by the location parameter calculator 23 until the image superimposing unit 33 described below sends a notification indicating that moving image reading is ON to the planar image reader 25. After the image superimposing unit 33 has communicated moving image reading ON to the planar image reader 25, the planar image reader 25 reads chronologically subsequent frames (or succeeding frames in a case of reverse replay) in accordance with the replay speed of the moving image. In a case where the image superimposing unit 33 sends a notification indicating that moving image reading is OFF to the planar image reader 25, the planar image reader 25 repeatedly reads a frame having the frame ID or the last read frame.

The line-of-sight direction/angle-of-view specifier 26 accepts the line-of-sight direction and the angle of view (enlargement or reduction) controlled by the user U. On the basis of the line-of-sight direction and the angle of view that are controlled and input, the view area T is determined.

The user U controls the line-of-sight direction and the angle of view (enlargement or reduction) as desired. Therefore, a part of the planar image P subjected to projection conversion may fit in the view area T or the planar image P subjected to projection conversion might not fit in the view area T at all. Accordingly, the first projection converter 28 generates mask data that indicates an area, in the projection-converted image, that is included in the view area T. The details are described with reference to FIGS. 14A and 14B.

The second projection converter 29 determines the view area T that corresponds to the line-of-sight direction and the angle of view accepted by the line-of-sight direction/angle-of-view specifier 26, performs, on the basis of the display size of the image display unit 31, perspective projection conversion for the view area T of the spherical image CE that has been read, and generates a display image. Therefore, the display image is a 2D planar image.

The image superimposing unit 33 superimposes the projection-converted image on the display image by using the mask data to generate a superimposed image. The details are described with reference to FIG. 15. The image display unit 31 displays the superimposed image on the display 508.

Location Parameter

Figure 13A:
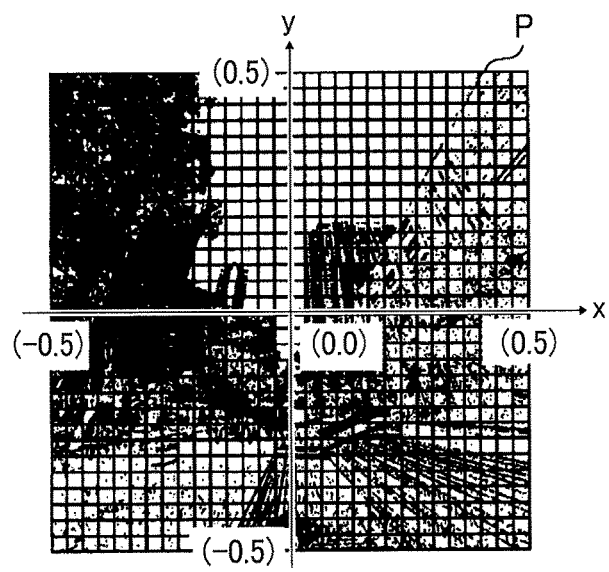
Figure 13B:
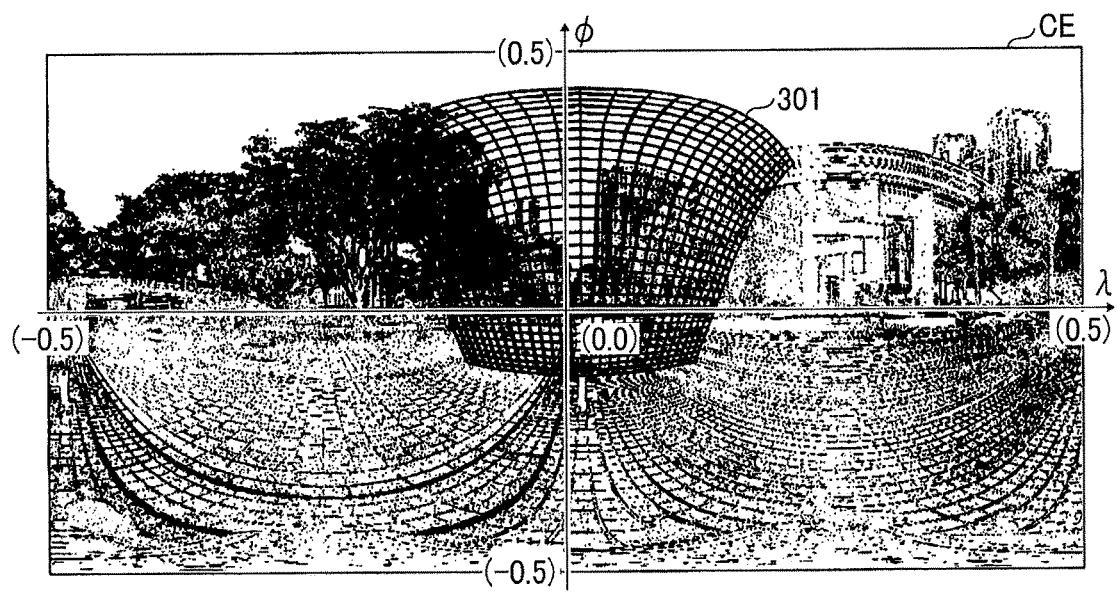

FIGS. 13A to 13C are diagrams illustrating projection conversion of the planar image P in a match area and an example of the location parameter PP for associating the planar image P with the match area. It is assumed that the correspondence between the planar image P and the spherical image CE has been determined via matching. The location parameter PP includes the latitude and longitude of a position in the spherical image CE at which the planar image P is present when the feature points match to the highest degree.

FIG. 13A illustrates the planar image P, and FIG. 13B illustrates the spherical image CE in equirectangular projection. In FIG. 13B, a match area 301 is illustrated. The location parameter calculator 23 divides the planar image P into grids, and obtains, for each intersection point of the grids represented by coordinates (x, y), a corresponding point ($\lambda$, $\varphi$) in the match area 301 of the spherical image CE as the location parameter PP. Here, $\lambda$ represents the longitude, and $\varphi$ represents the latitude. FIG. 13C illustrates an example of the location parameter PP. The coordinates of each grid in the planar image P is associated with the latitude and longitude of a corresponding point in the match area 301 of the spherical image CE.

Processing by First Projection Converter

Figure 14A:
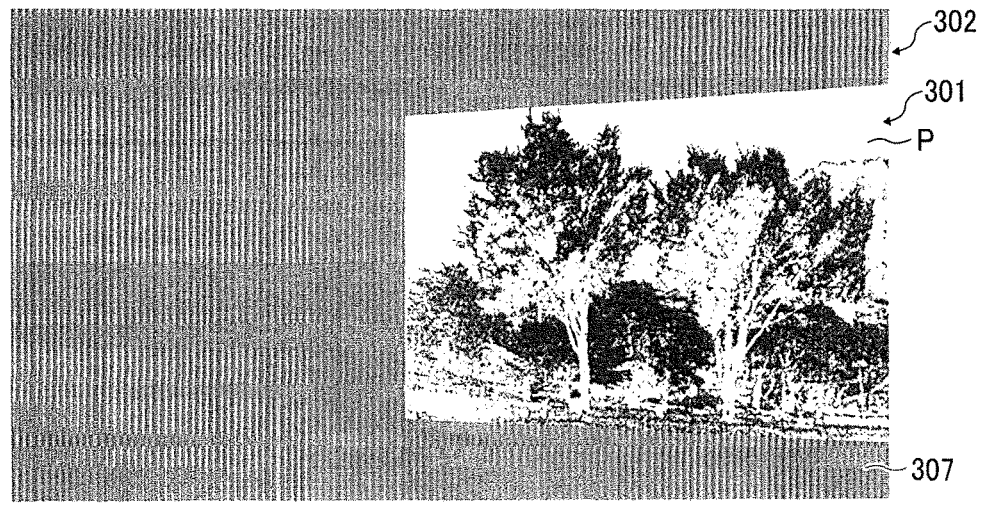
FIGS. 14A and 14B are example diagrams illustrating a projection-converted image and mask data generated by a projection converter.
Figure 14B:
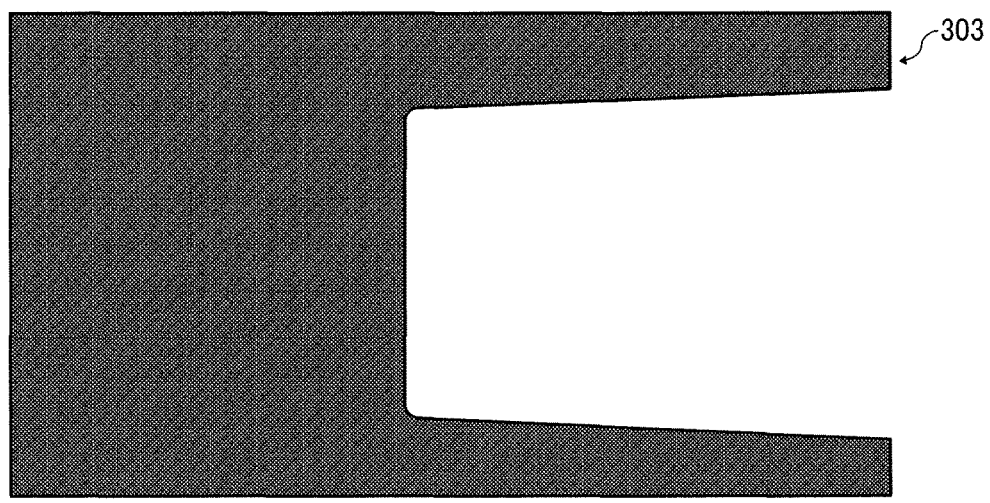

FIGS. 14A and 14B are example diagrams illustrating a projection-converted image 302 and mask data 303 generated by the first projection converter 28. FIG. 14A illustrates the projection-converted image 302. The projection-converted image 302 has an area having the same size as the size of the view area T in the spherical image CE in equirectangular projection. The planar image P after projection conversion is placed on the match area 301. The planar image P is subjected to projection conversion and placed on the match area 301, and therefore, the planar image P is in a state of trapezoidal distortion. In the projection-converted image 302, a portion not covered by the planar image P is a uniform gray image 307. The uniform image 307 is not used in superimposition, and therefore, may have any pixel value.

FIG. 14B illustrates the mask data 303 that corresponds to the planar image P illustrated in FIG. 14A. The mask data 303 is data used to take the planar image P included in the view area T from the projection-converted image 302 illustrated in FIG. 14A. The area of white pixels in the mask data 303 corresponds to an area that is the area of the planar image P and the area of the view area T. Therefore, the area of white pixels in the mask data 303 is equal to or smaller than the area of the planar image P. The mask data 303 illustrated in FIG. 14B is mask data in a case where the view area view area T is larger than the planar image P. Therefore, in the example illustrated in FIG. 14A, the match area 301 is substantially equal to the area of white pixels in the mask data 303. In a case where the view area T and the planar image P do not overlap at all, the entire area of the mask data 303 is constituted by black pixels. In a case where the view area T is smaller than the planar image P, the mask data 303 is constituted by only white pixels. As described above, the area of white pixels in the mask data 303 and the match area 301 have the same size and are present at the same position.

The image superimposing unit 33 performs a mask process using the projection-converted image 302 and the mask data 303. The mask process is a process for taking a pixel corresponding to a white pixel in the mask data 303 from the projection-converted image 302. The image superimposing unit 33 acquires a pixel value corresponding to the position of a white pixel from the projection-converted image 302 and superimposes the pixel value on the display image at the same position as the position in the projection-converted image 302.

It is preferable to provide, at the boundary between the black pixels and the white pixels of the mask data 303, gradations in which pixels gradually change from the white pixels to the black pixels. Accordingly, the boundary between the spherical image CE having a low resolution and the planar image P having a high resolution can be less noticeable.

Processing by Image Superimposing Unit

Processing performed by the image superimposing unit 33 is described with reference to FIG. 15. FIG. 15 is an example diagram schematically illustrating superimposition of the planar image P on the spherical image CE. As illustrated in FIG. 15, a display image 304 obtained by the second projection converter 29 performing perspective projection conversion for the view area T, the projection-converted image 302 (FIG. 14A), and the mask data 303 (FIG. 14B) are input to the image superimposing unit 33.

The image superimposing unit 33 superimposes the projection-converted image 302, which is a wider-angle image, on the display image 304. The image superimposing unit 33 performs a mask process using the mask data 303 to take the projection-converted image 302 corresponding to the pixel positions of white pixels in the mask data 303 and overlay the taken image on the display image 304. In this case, corresponding pixels in the display image 304 are lost at this time. Accordingly, a superimposed image 305 is generated in which the planar image P having a high resolution is placed on the spherical image CE having a low resolution.

Alternatively, a transparent layer may be used, and the projection-converted image 302 corresponding to the pixel positions of white pixels in the mask data 303 may be taken and placed on the transparent layer. In this case, no pixels are lost form the display image 304 and, for example, the user U can switch between display and non-display of the planar image P.

The image superimposing unit 33 outputs the superimposed image 305. In the superimposed image 305, the planar image P having a high resolution is placed on the spherical image CE having a low resolution.

In this embodiment, as described above, the display control apparatus 30 performs perspective projection conversion of the spherical image CE and superimposition of the planar image P in parallel. If the planar image P is placed on the spherical image CE, and thereafter, perspective projection conversion is performed, the resolution of the spherical image CE needs to be the same as the resolution of the planar image P, resulting in an increase in the amount of data. In this embodiment, the display image 304 is generated, and thereafter, the planar image P is superimposed, which can suppress an increase in the amount of data.

The display control apparatus 30 repeatedly superimposes the planar image P on the spherical image CE in accordance with the display cycle of the display 508 (for example, 30 to 60 times per second). Accordingly, the display control apparatus 30 retains one planar image P and one spherical image CE and generates the superimposed image 305 in real time from the point of view according to an operation by the user U. Furthermore, the display control apparatus 30 can replay a moving image.

Planar Image P on Spherical Image CE

Figure 16:
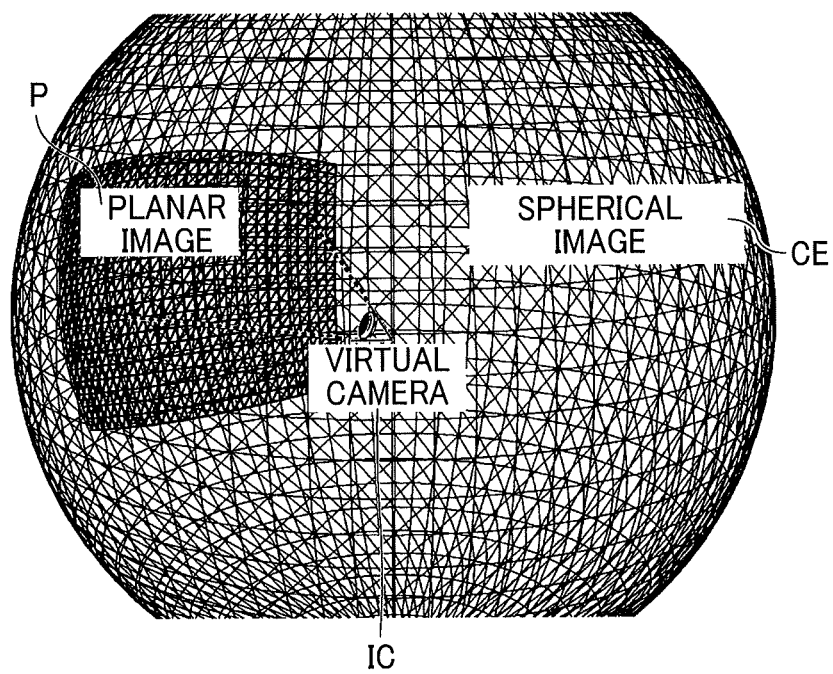
FIG. 16 is a diagram schematically illustrating a planar image superimposed on a spherical image.

FIG. 16 is a diagram schematically illustrating the planar image P superimposed on the spherical image CE. As described above, the planar image P, which is a plane, is superimposed on the display image 304 as is, and is not placed on the sphere CS as illustrated in FIG. 16. However, the planar image P seems to be superimposed on part of the sphere having the same center position and the same radius as those of the spherical image CE when viewed by the user U, as illustrated in FIG. 16.

As illustrated in FIG. 16, the planar image P may be superimposed on the spherical image CE that is a 3D image. The longitude and latitude corresponding to the planar image P are known via matching (using the location parameter PP), and therefore, the display control apparatus 30 can place the planar image P on the spherical image CE by using expressions (1). In this case, for example, hidden surface removal (Z-buffer algorithm) using depth information is not used, and rendering needs to be performed on a later-priority basis.

Superimposition of a plurality of planar images P can be similarly performed by the location parameter calculator 23 calculating the location parameter PP for each of the planar images P. In this case, regarding the order of rendering, rendering of a wide-angle image is performed first, and rendering of a telephoto image is performed later. Accordingly, in a case where images are captured by the digital camera 9 having the same number of pixels, the planar image P having a low resolution is not overlaid on the planar image P having a high resolution.

Superimposition Procedure

Figure 17:
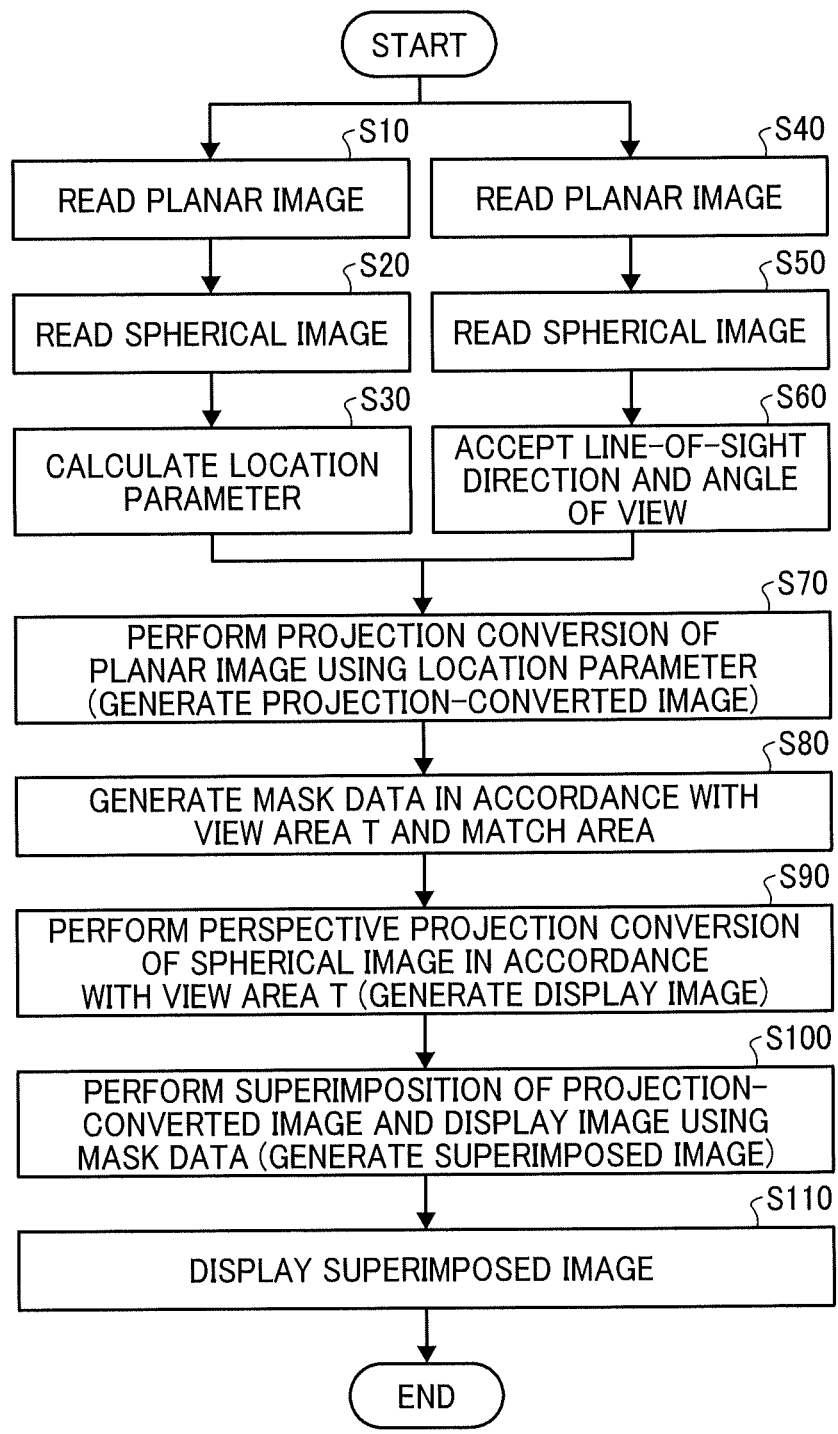
FIG. 17 is a flowchart illustrating operation of superimposing a planar image on a spherical image, performed by the display control apparatus, according to an embodiment.

FIG. 17 is an example flowchart illustrating a procedure for the display control apparatus 30 to superimpose the planar image P on the spherical image CE. The process in FIG. 17 starts when, for example, a user gives an instruction for superimposition. Steps S10 to S30 are performed in parallel with steps S40 to S60; however, steps S10 to S60 may be performed sequentially.

The planar image reader 22 reads the planar image P (step S10). The spherical image reader 21 reads the spherical image CE (step S20). The location parameter calculator 23 calculates the location parameter PP (step S30).

The planar image reader 25 reads the planar image P (step S40). The spherical image reader 27 reads the spherical image CE (step S50). The line-of-sight direction/angle-of-view specifier 26 accepts a line-of-sight direction and an angle of view (step S60). Step S60 is performed as appropriate, for example, at every predetermined time or according to detection of a user operation.

Subsequently, the first projection converter 28 performs projection conversion of the planar image P using the location parameter PP to generate the projection-converted image 302 (step S70).

Subsequently, the first projection converter 28 generates the mask data 303 in accordance with the view area T that is determined on the basis of the line-of-sight direction and the angle of view and in accordance with the planar image P (match area) subjected to projection conversion (step S80).

Subsequently, the second projection converter 29 performs perspective projection conversion of the spherical image CE in accordance with the view area T to generate the display image 304 (step S90).

Subsequently, the image superimposing unit 33 performs superimposition of the projection-converted image 302 and the display image 304 using the mask data 303 to generate the superimposed image 305 (step S100).

Subsequently, the image display unit 31 displays the superimposed image 305 (step S110). The display control apparatus 30 repeats the process from step S60 to step S110 in FIG. 17.

Functions Related to Replay of Moving Image

Figure 18:
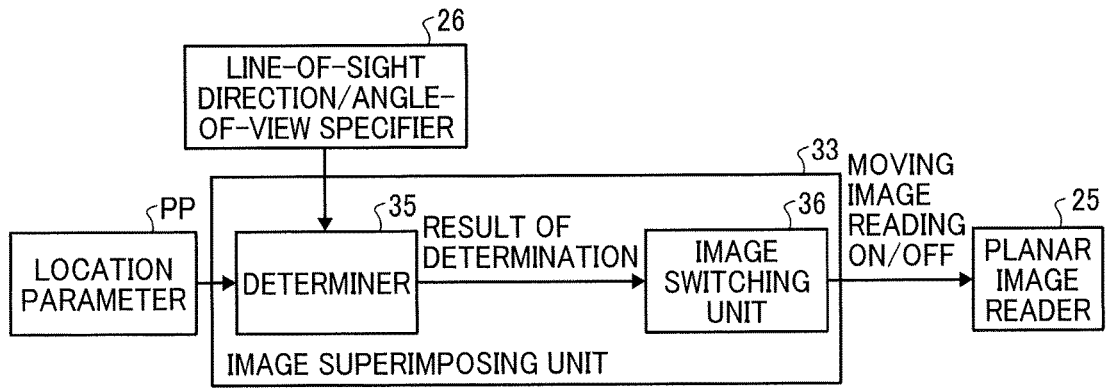
FIG. 18 is a schematic block diagram illustrating a functional configuration of an image superimposing unit, according to an embodiment.

Now, functions related to replay of the planar image P superimposed on the spherical image CE are described with reference to FIG. 18 to FIG. 23. FIG. 18 is an example functional block diagram illustrating functions of the image superimposing unit 33 as blocks. The image superimposing unit 33 includes a determiner 35 and an image switching unit 36. The determiner 35 determines whether it is inferred that the user U views the planar image P superimposed on the superimposed image 305 and transmits the result of determination to the image switching unit 36. The image switching unit 36 sends a notification indicating that moving image reading is ON or moving image reading is OFF to the planar image reader 25 in accordance with the result of determination.

Determination Regarding Replay of Moving Image

In a case where it is inferred that the user U views the planar image P superimposed on the superimposed image 305 as described above, the display control apparatus 30 starts replaying a moving image. Specific examples of when it is inferred that the user U views the planar image P include cases when any one of the following conditions (i) to (iii) is satisfied. In such case, a moving image is replayed.

(i) The angle of view of the planar image P in the current view area T relative to the angle of view of the view area T is equal to or larger than a predetermined value.

(ii) The area of the planar image P has an angle of view equal to or larger than a predetermined value.

(iii) The user U clicks the planar image P.

Note that the case where it is inferred that the user U views the planar image P includes a case where the user U is actually viewing the planar image P and a case where the user U is likely to view the planar image P. The condition (iii) may be referred to as replay of a moving image in response to an operation by the user U for viewing.

First, the method for determination in "(i) the case where the angle of view of the planar image P in the current view area T relative to the angle of view of the view area T is equal to or larger than a predetermined value" is described.

Figure 19A:
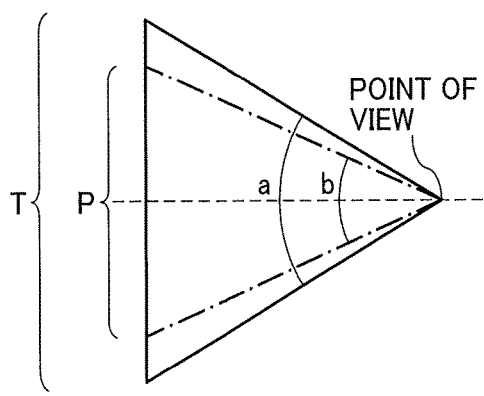
FIGS. 19A to 19D are example diagrams illustrating the relative position of a planar image relative to a view area.

FIGS. 19A to 19D are example diagrams illustrating the relative position of the planar image P relative to the view area T. In FIG. 19A, the entire planar image P is included in the view area T. The view area T is an area in the spherical image CE that is displayed on the display 508, and therefore, the user U views the planar image P from substantially the front. When the angle of view of the view area T is represented by a, and the angle of view of the planar image P is represented by b, if angle of view a>angle of view b is satisfied, the entire planar image P and part of the spherical image CE are visible to the user U. In the state as illustrated in FIG. 19A, it is inferred that the user U wants to view the planar image P.

In a case where the spherical image CE is larger than the planar image P to some extent, the determiner 35 need not determine that the user U wants to view the planar image P. Here, the determiner 35 determines, for example, whether the angle of view a is 1.2 times the angle of view b or less. That is, in a case where the angle of view a is 1.2 times the angle of view b or less, the determiner 35 determines that the ratio of the angle of view of the planar image P relative to the current angle of view is equal to or larger than a predetermined value. Then, the image switching unit 36 transmits moving image replay request ON to the planar image reader 25. In a case where the determiner 35 determines that the angle of view a is more than 1.2 times the angle of view b, the image switching unit 36 transmits moving image replay request OFF to the planar image reader 25.

The view area T is known. The latitude and longitude of the planar image P are registered as the location parameter PP, and therefore, the angle of view b is calculated from the location parameter PP. The details are described with reference to FIG. 20 and FIG. 21.

Figure 19B:
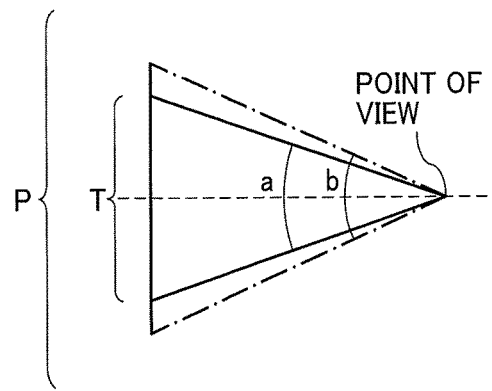

In FIG. 19B, the view area T is narrower than the planar image P. That is, the user U views only the planar image P. In this case, the angle of view a is 1.2 times the angle of view b or less, and therefore, a moving image is replayed, as a matter of course.

Figure 19C:
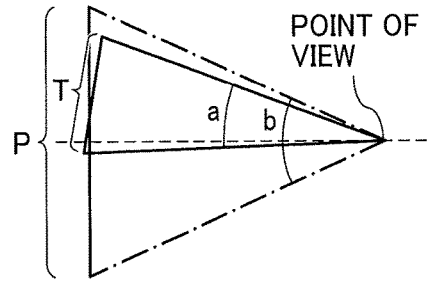

In FIG. 19C, only an upper portion of the planar image P is included in the view area T. That is, the user U views an upper portion of the planar image P. However, the view area T is fully included in the planar image P (the angle of view a is 1.2 times the angle of view b or less), and therefore, the image switching unit 36 transmits moving image replay request ON.

Figure 19D:
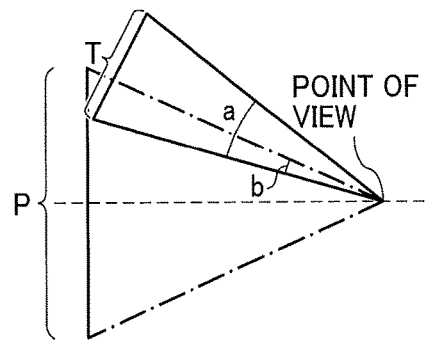

In FIG. 19D, the shift (angle) between the center of the view area T and the center of the planar image P is large, and part of the view area T lies outside the planar image P. In this case, the planar image P in the view area T is small relative to the view area T (the angle of view a is more than 1.2 times the angle of view b), and therefore, the image switching unit 36 transmits moving image replay request OFF.

The threshold used to determine whether a moving image is replayed is set to, for example, 1.2 and may be set to any value larger than 1.0. For example, the threshold may be set to a value from 1.1 to 1.5. The user U may set the threshold.

Figure 20:
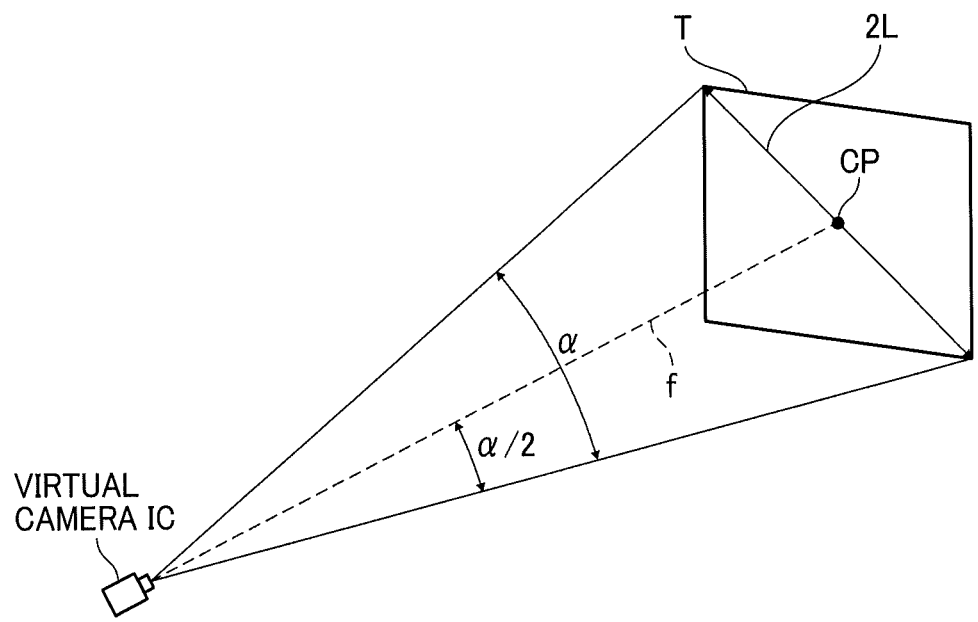
FIG. 20 is an example diagram illustrating a way of calculating an angle of view a and an angle of view b.

FIG. 20 is an example diagram illustrating a way of calculating the angle of view a and the angle of view b. The angle of view a is calculated from the view area T, which is determined by the user U performing an operation. When the distance from the virtual camera IC to the view area T is represented by f, and the length of a diagonal line of the view area T is represented by 2L, the angle of view α, the distance f, and the length L has a relationship expressed by expression (2).

$$L/f = \tan(\alpha/2) \qquad (2)$$

The coordinates of diagonally opposite vertexes of the view area T are known from the operation performed by the user U, and therefore, the length of the diagonal line 2L can be easily calculated. The distance f is known from the radius of the full sphere or the operation performed by the user U. Therefore, the angle of view α can be calculated by using expression (2).

Figure 21:
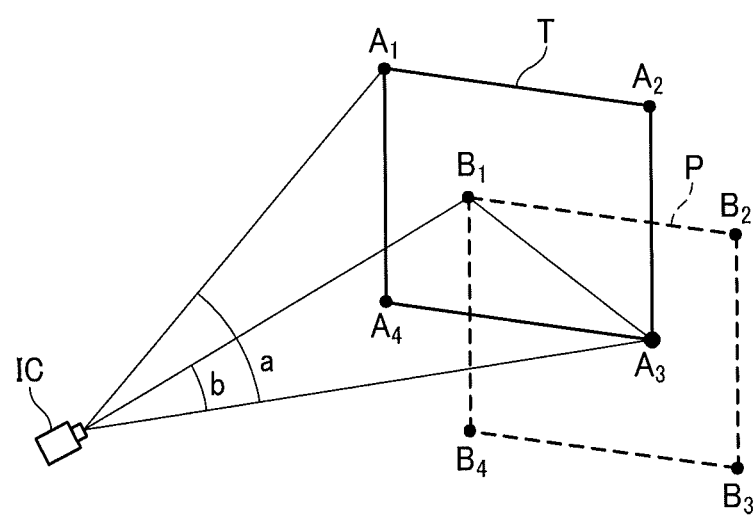
FIG. 21 is an example diagram illustrating relationships between the vertexes of a view area and the diagonally opposite vertexes of a planar image.

The angle of view b can be similarly calculated. The angle of view b is calculated in a case where at least part of the planar image P is included in the view area T. FIG. 21 is a diagram illustrating a relationship between the view area T and the planar image P. The determiner 35 determines whether the planar image P is included in the view area T based on each of the four vertexes. The four vertexes of the view area T are represented by A1 to A4, and the four vertexes of the planar image P are represented by B1 to B4. The vertexes B1 to B4 are identified on the basis of, for example, the longitudes and latitudes of corresponding points on the full sphere or may be identified on the basis of the coordinates of corresponding points on the display 508.

For example, the vertex B1 is determined as follows.

Longitude of vertex A1≤Longitude of vertex B1≤Longitude of vertex A2 and

Latitude of vertex A1≥Latitude of vertex B1≥Latitude of vertex A4

The vertexes B2, B3, and B4 are similarly determined. If diagonally opposite vertexes (B1 and B3, and B2 and B4) are included the view area T, the angle of view b can be calculated from the location parameter PP by using expression (2). If not all of the vertexes B1 to B4 of the planar image P are included in the view area T, as illustrated in FIG. 21, the angle of view b is calculated from the vertex B1 included in the view area T and the vertex A3 of the view area T. The display control apparatus 30 includes settings indicating that a diagonally opposite vertex corresponding to the vertex B1 is the vertex A3, a diagonally opposite vertex corresponding to the vertex B2 is the vertex A4, a diagonally opposite vertex corresponding to the vertex B3 is the vertex A1, and a diagonally opposite vertex corresponding to the vertex B4 is the vertex A2.

Display Examples

Figure 22A:
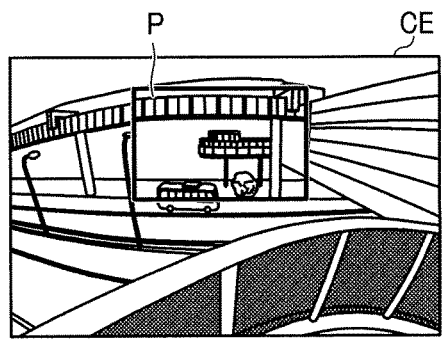
FIGS. 22A to 22E are diagrams illustrating an example planar image that starts being replayed when a user enlarges a spherical image.

FIGS. 22A to 22E are diagrams illustrating an example of the planar image P that starts being replayed when the user U enlarges the spherical image CE. In FIG. 22A, the planar image P that is small is included in the view area T. In the state illustrated in FIG. 22A, the angle of view a is more than 1.2 times the angle of view b, and therefore, a moving image is not replayed.

Figure 22B:
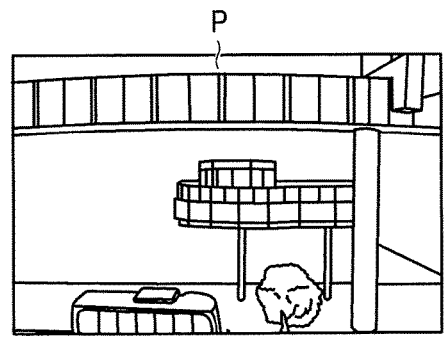
Figure 22C:
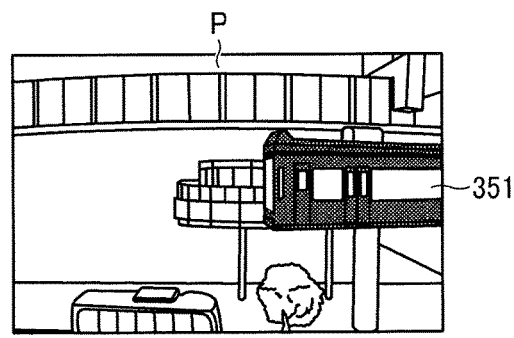
Figure 22D:
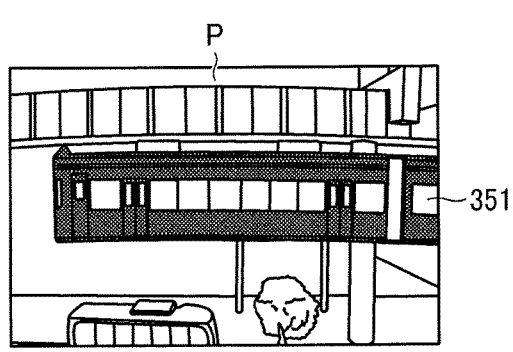
Figure 22E:
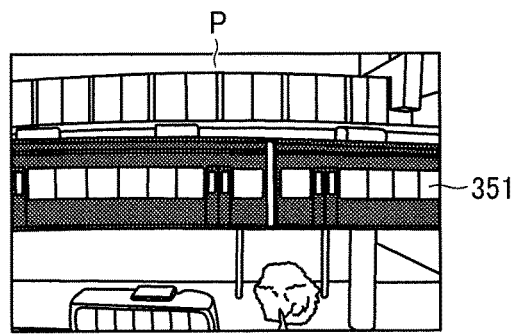

In FIG. 22B, the angle of view a is 1.2 times the angle of view b or less, and therefore, replay of a moving image starts. In FIG. 22C to FIG. 22E, the spherical image CE is not enlarged, and therefore, the composition (angle of view) remains the same. However, the moving image is replayed, and therefore, the monorail train 351 gradually moves from the right to the left.

That is, when the user U enlarges the planar image P such that the ratio of the planar image P to the spherical image CE is equal to or larger than a threshold, replay of a moving image automatically starts, and the user U can easily know the situation from the moving image (can enjoy the active image). Further, when the user U enlarges the planar image P, replay of a moving image starts. Therefore, motion seems to start suddenly on the screen, which can attract the user U's attention.

Operation Procedure

Figure 23:
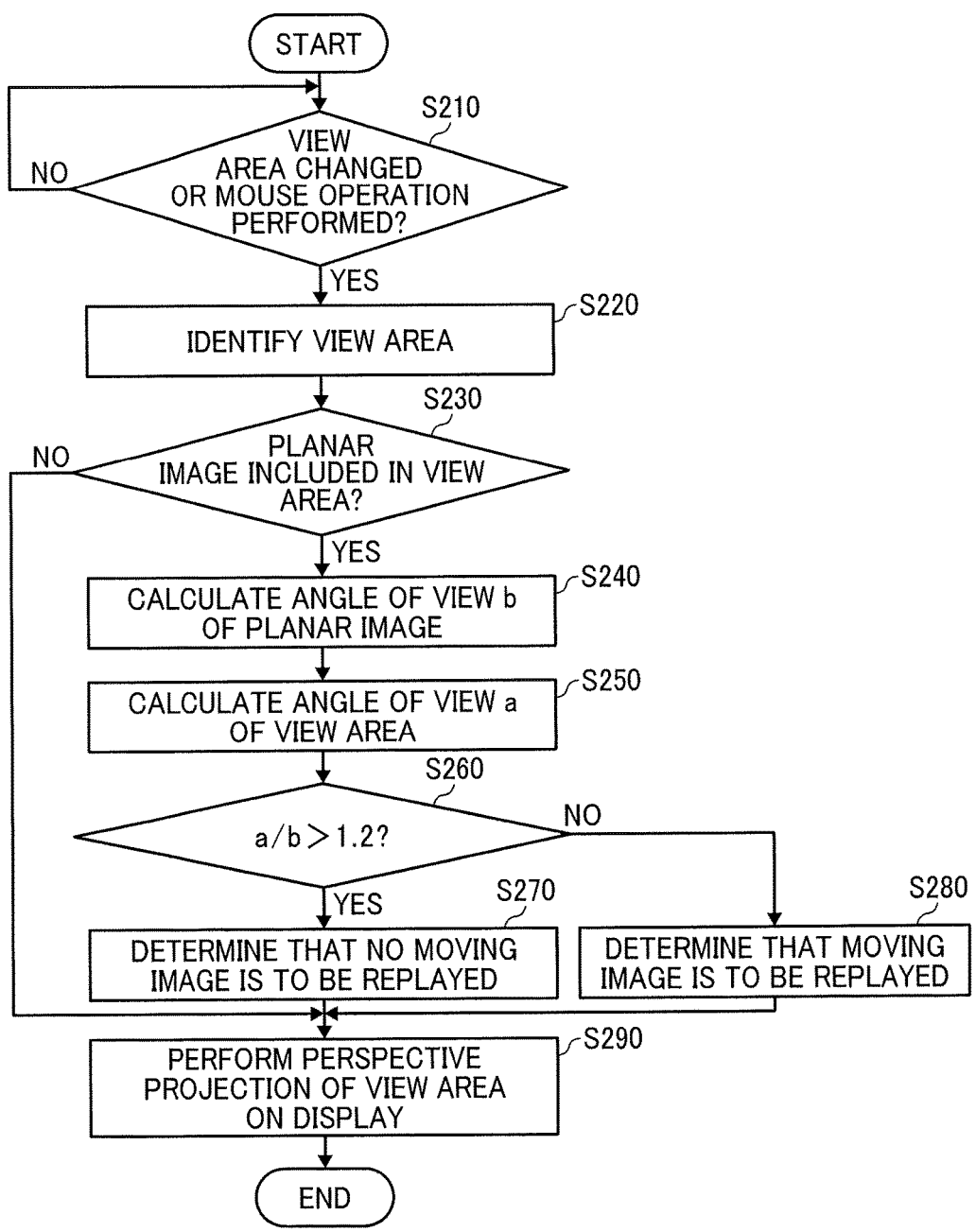
FIG. 23 is a flowchart illustrating operation of controlling replay of a moving image, performed by the display control apparatus, according to an embodiment.

FIG. 23 is an example flowchart illustrating a procedure for the display control apparatus 30 to control whether to replay a moving image. The procedure illustrated in FIG. 23 starts when the display control apparatus 30 displays the spherical image CE. It is assumed that the planar image P has been superimposed on the spherical image CE.

The determiner 35 determines whether the view area T is changed by the user U or a mouse operation is performed by the user U (step S210). The user U changing the view area T means the user U changing the line-of-sight direction or performing an enlarging or reducing operation. Specifically, the line-of-sight direction/angle-of-view specifier 26 converts an operation performed by the user U to a line-of-sight direction and an angle of view and transmits the line-of-sight direction and the angle of view to the image superimposing unit 33. Alternatively, the determiner 35 may simply determine whether a mouse operation is performed. Accordingly, the flow proceeds to step S220 upon a specific mouse event even if the view area T is not changed.

The image superimposing unit 33 identifies the view area T on the basis of the line-of-sight direction and the angle of view (step S220). That is, the latitude range and the longitude range that correspond to the view area T in the spherical image CE are identified.

Subsequently, the determiner 35 determines whether at least part of the planar image P is included in the view area T (step S230). If the planar image P is not included in the view area T at all, a moving image need not be replayed, and therefore, the flow proceeds to step S290.

If at least part of the planar image P is included in the view area T (Yes in step S230), the determiner 35 calculates the angle of view b of the planar image P (step S240). The determiner 35 further calculates the angle of view a of the view area T (step S250).

The determiner 35 compares the ratio a/b between the angle of view a and the angle of view b with a threshold 1.2 and determines whether the ratio a/b is larger than the threshold 1.2 (step S260).

If determination in step S260 results in Yes (if the ratio a/b is larger than the threshold 1.2), it is not inferred that the user U views the planar image P, and therefore, the image switching unit 36 sends a notification indicating that moving image reading is OFF to the planar image reader 25 (step S270).

If determination in step S260 results in No (if the ratio a/b is equal to or smaller than the threshold 1.2), it is inferred that the user U views the planar image P, and therefore, the image switching unit 36 sends a notification indicating that moving image reading is ON to the planar image reader 25 (step S280).

The image display unit 31 displays, on the display 508, the superimposed image 305 generated by superimposing the planar image P, which is a still image or a moving image, on the spherical image CE (step S290). If determination in step S230 results in No, the planar image P is not superimposed.

With the process described above, when the user U enlarges and displays the planar image P, a moving image can be replayed. When the user U views a portion other than the planar image P, replay of the moving image can be stopped. While a moving image is replayed, the image display unit 31 may display a menu for the user U to control replay of the moving image and accept, for example, stop, replay, rewinding, or fast forward in accordance with an operation by the user U.

Figure 24:
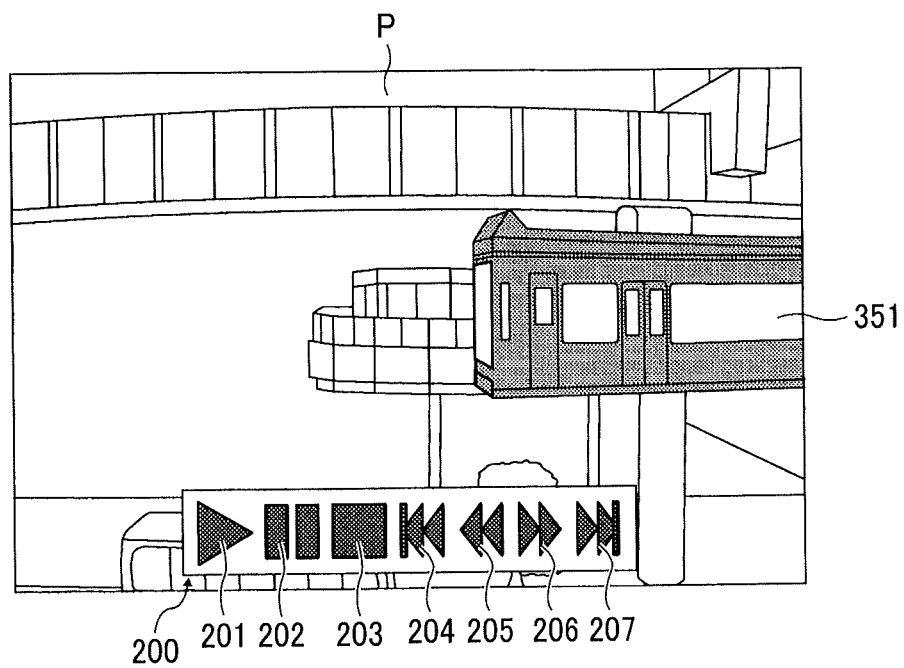
FIG. 24 is a diagram illustrating an example menu for a user to control replay of a moving image.

FIG. 24 is a diagram illustrating an example menu (user interface (UI)) for a user to control replay of a moving image. FIG. 24 illustrates a menu 200 that includes a replay button 201, a pause button 202, a stop button 203, a fast-forward button 206, a fast-rewind button 205, a subsequent-moving-image button 207, and a previous-moving-image button 204. The menu 200 may further include, for example, a replay repeat button. The subsequent-moving-image button 207 and the previous-moving-image button 204 are activated in a case where the planar image P includes a plurality of moving images. The designs of the buttons illustrated in FIG. 24 are merely examples.

The menu 200 as illustrated in FIG. 24 is to be displayed, for example, in a case where a moving image is replayed and the user clicks the moving image replay area or in a case where replay of a moving image ends.

When the entire moving image of the planar image P has been replayed, the planar image reader 25 may repeat reading of the planar image P from the first frame or stop reading the planar image P.

Determination Method for (ii)

Next, the method for determination in "(ii) the case where the area of the planar image P has an angle of view equal to or larger than a predetermined value" is described. Determination in this case is substantially the same as that in (i) and is based on the assumption that, in a case where the user U enlarges and displays the planar image P, it is inferred that the user U wants to view the planar image P. In the method for determination, the coordinates of the vertexes B1 to B4 of the planar image P are used as described with reference to FIG. 21. Alternatively, the coordinates of corresponding points on the display 508 obtained as a result of perspective projection conversion of the coordinates of the vertexes B1 to B4 of the planar image P may be used to perform determination.

Alternatively, it may be inferred that the user U wants to view the planar image P when the distance between the center of the planar image P and the center of the view area T is smaller than a threshold without using the angle-of-view ratio. The threshold may be set to a value that corresponds to a fraction of the angle of view of the view area T, such as a quarter of the angle of view of the view area T.

Figure 25:
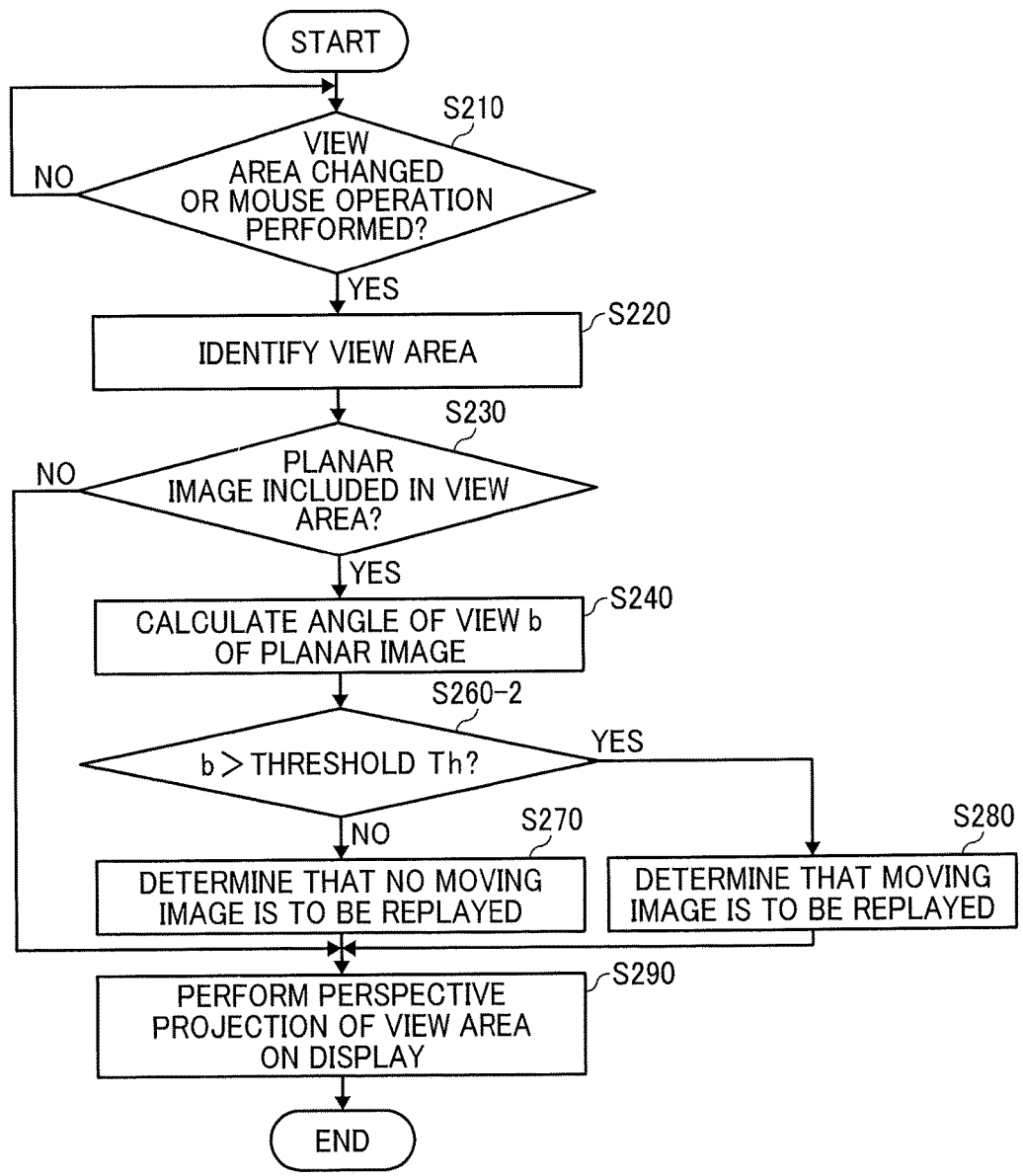
FIG. 25 is a flowchart illustrating operation of controlling replay of a moving image, performed by the display control apparatus, according to an embodiment.

FIG. 25 is an example flowchart illustrating a procedure for the display control apparatus 30 to control whether to replay a moving image. In the description of FIG. 25, differences from FIG. 23 are described. In FIG. 25, the determiner 35 need not calculate the angle of view a of the view area T, and therefore, step S250 is omitted.

In step S260-2, the determiner 35 determines whether the angle of view b is larger than a threshold Th. If determination in step S260-2 results in No (if the angle of view b is equal to or smaller than the threshold), it is not inferred that the user U views the planar image P, and therefore, the image switching unit 36 sends a notification indicating that moving image reading is OFF to the planar image reader 25 (step S270).

If determination in step S260-2 results in Yes (if the angle of view b is larger than the threshold), it is inferred that the user U views the planar image P, and therefore, the image switching unit 36 sends a notification indicating that moving image reading is ON to the planar image reader 25 (step S280).

The threshold Th is, for example, an angle of view that corresponds to a specific number of pixels with which the user U can recognize an object. When a typical number of pixels of the display 508 is assumed to be 768×1024, the threshold Th can be set to, for example, an angle of view that corresponds to a number of pixels 500. Accordingly, in a case where the planar image P is enlarged to some extent and displayed, a moving image can be replayed.

Determination Method for (iii)

Next, the method for determination in "(iii) the case where the user U clicks the planar image P" is described. In the case where the user U clicks the planar image P, it is obvious that the user U wants to view the planar image P. Therefore, even if any of the conditions (i) and (ii) is not satisfied, it is determined that a moving image is to be replayed. In a case of display on a device including a touch panel, a similar operation is performed when the planar image P is touched. It is obvious that the user U wants to view the planar image P, and therefore, if the second projection converter 29 displays the planar image P across the view area T, the user U need not perform an operation so as to place the planar image P in front of the user U, which is convenient to the user U. Specifically, this display method is a method in which, when the user U clicks the planar image P illustrated in FIG. 22A, the view area T illustrated in FIG. 22A changes to the view area T as illustrated in FIG. 22B. Such a display method is referred to as automatic enlargement of the planar image P and described.

Figure 26:
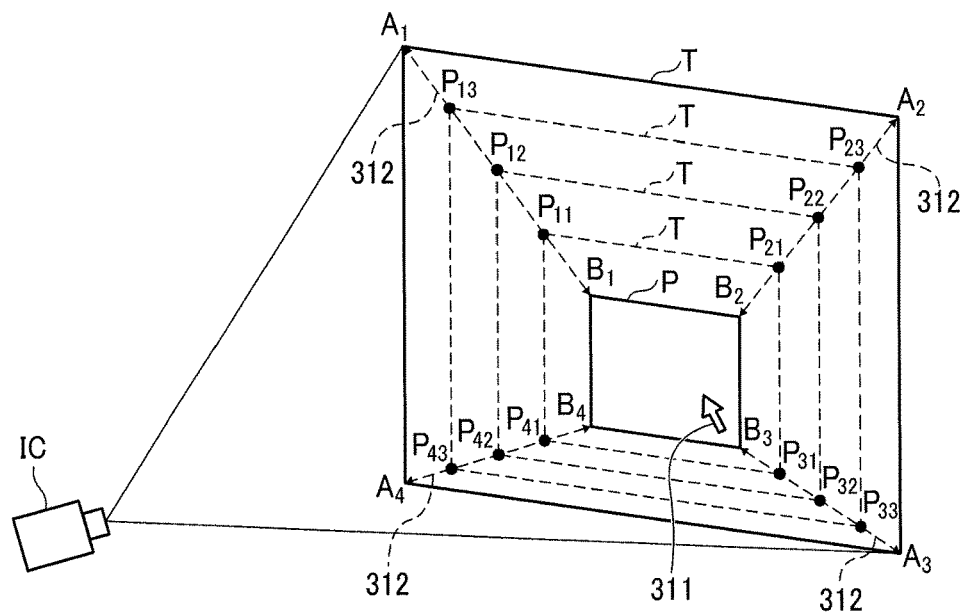
FIG. 26 is an example diagram illustrating a process for automatic enlargement of a planar image in a view area.

Automatic enlargement of the planar image P is described with reference to FIG. 26. FIG. 26 is an example diagram illustrating a process for automatic enlargement of the planar image P in the view area T. It is assumed that the user U performs a click operation in a state where a mouse cursor 311 is placed over the planar image P. In a case of a touch panel, this operation corresponds to an operation in which the user U taps the planar image P with their finger. A mouse cursor and a touch panel are called pointing devices. To simplify description, the following description is given under the assumption that the pointing device is, for example, the mouse cursor 311.

The line-of-sight direction/angle-of-view specifier 26 converts the coordinates of a position on the display 508 at which the mouse cursor 311 is placed and at which a click operation is performed to 3D coordinates of a corresponding position in the spherical image CE. This conversion corresponds to the reverse of perspective projection conversion. The determiner 35 converts the 3D coordinates corresponding to the position of the mouse cursor 311 to a longitude and latitude and determines whether the position of the mouse cursor 311 indicated by the coordinates is within the planar image P. This determination is performed as follows.

Longitude of vertex B1≤Longitude corresponding to coordinates of mouse cursor position≤Longitude of vertex B2 and Latitude of vertex B1≥Latitude corresponding to coordinates of mouse cursor position≥Latitude of vertex B4

In a case where the position of the mouse cursor 311 indicated by the coordinates is within the planar image P, the determiner 35 determines that the planar image P is clicked.

In this case, the image display unit 31 automatically enlarges the planar image P. The second projection converter 29 performs image processing for gradually enlarging the planar image P so as to fit in the view area T. Specifically, a line segment 312 connecting the vertex A1 and the vertex B1, a line segment 312 connecting the vertex A2 and the vertex B2, a line segment 312 connecting the vertex A3 and the vertex B3, and a line segment 312 connecting the vertex A4 and the vertex B4 are each divided at equal intervals. In FIG. 26, each of the line segments 312 is divided into four line segment. The interpolation points on the line segments 312 obtained as a result of the division are referred to as $P_{1i}$ to $P_{4i}$ (i is an integer from 1 to 3).

The process for automatically enlarging the planar image P is a process for decreasing the angle of view a of the view area T. The second projection converter 29 reduces the view area T so as to fit in an area formed by connecting the interpolation points P13, P23, P33, and P43 (decreases the angle of view a). Subsequently, the second projection converter 29 reduces the view area T so as to fit in an area formed by connecting the interpolation points P12, P22, P32, and P42. Subsequently, the second projection converter 29 reduces the view area T so as to fit in an area formed by connecting the interpolation points P11, P21, P31, and P41. Subsequently, the second projection converter 29 reduces the view area T so as to fit in an area formed by connecting the vertexes B1, B2, B3, and B4 of the planar image P.

With such image processing, the planar image P appears to gradually enlarge to the user U. The planar image P is subjected to perspective projection conversion in the view area T and displayed across the display 508 (across an area displayed by display software), and therefore, the planar image P appears to be large to the user U.

Figure 27:
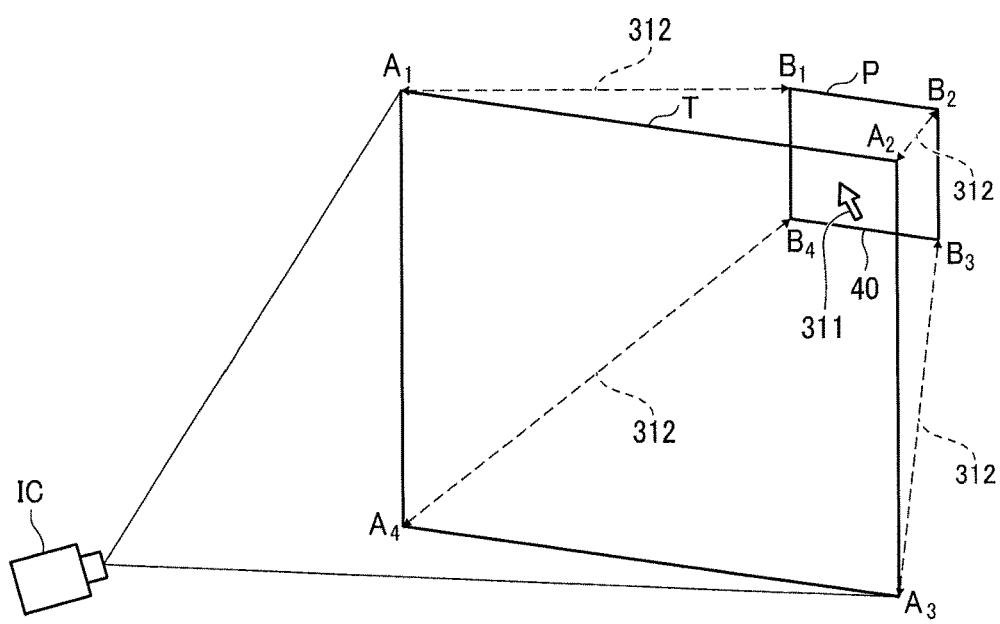
FIG. 27 is an example diagram illustrating a process for automatic enlargement of a planar image in a case where the entire planar image is not included in a view area.

In a case where the entire planar image P is not included in the view area T, automatic enlargement can be similarly performed. FIG. 27 is an example diagram illustrating a process for automatic enlargement of the planar image P in the case where the entire planar image P is not included in the view area T. In FIG. 27, only the vertex B4 of the planar image P is within the view area T. The vertexes B1 to B3 of the planar image P are not displayed in the view area T but the coordinates of the vertexes B1 to B3 are known, and therefore, the planar image P can be automatically enlarged in a similar manner to FIG. 26.

Operation Procedure

Figure 28:
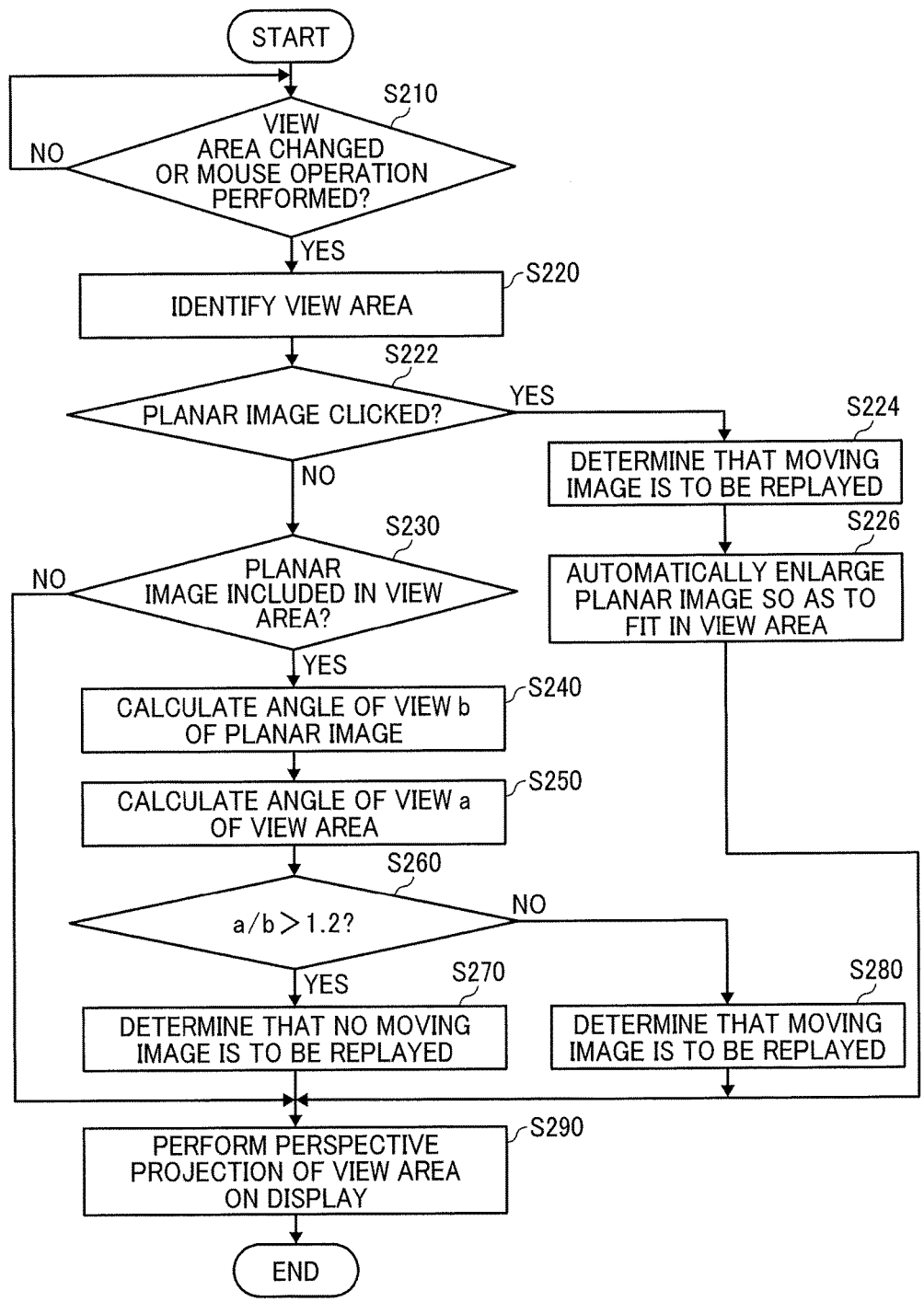
FIG. 28 is a flowchart illustrating operation of controlling replay of a moving image, performed by the display control apparatus, according to an embodiment.

FIG. 28 is an example flowchart illustrating a procedure for the display control apparatus 30 to determine whether to replay a moving image. In the description of FIG. 28, differences from FIG. 23 are described.

The process in steps S210 and S220 is performed in a substantially similar as described above referring to FIG. 23. Subsequently, the determiner 35 determines whether the planar image P is clicked (step S222). If determination in step S222 results in No, the subsequent process is similar to that in FIG. 23.

If determination in step S222 results in Yes, the image switching unit 36 sends a notification indicating that moving image reading is ON to the planar image reader 25 (step S224). Accordingly, it is determined that a moving image is to be replayed.

The second projection converter 29 automatically enlarges the planar image P (step S226). With the process described above, the user U need not perform an operation so as to place the planar image P in front of the user U.

It is preferable that the user U be allowed to set whether a moving image is to be replayed when the user U clicks the planar image P. After replay of the moving image, when the user U performs an operation for displaying a portion other than the planar image P and the condition in step S260 is satisfied, the moving image can be stopped. Also in this case, an operation menu may be displayed when the moving image is displayed.

Case where Planar Image P is Still Image and Spherical Image CE is Moving Image

In this embodiment, the description has been given under the assumption that the planar image P is a moving image and the spherical image CE is a still image. Even in a case where the planar image P is a still image and the spherical image CE is a moving image, the above-described display can be implemented with similar processing. In this case, the spherical image reader 27 needs to read frames of the spherical image CE that is a moving image. For example, in a case where the display control apparatus 30 displays the spherical image CE of the inside of an art museum, pictures are represented by the planar images P, and the spherical image CE obtained by capturing an image of the inside of the entire art museum is provided as a moving image. In the planar images P, no visitors are present. Therefore, the user U can enlarge and view the planar images P and easily know the situation from a state represented by the spherical image CE in which, for example, visitors move around the art museum.

In this case, the spherical image CE is displayed as a moving image until one of the conditions (i) to (iii) described above is satisfied. When one of the conditions (i) to (iii) is satisfied, the spherical image CE is displayed as a still image. Accordingly, when the user U performs an operation for enlarging and displaying the planar image P, the spherical image CE becomes a still image, resulting in increased viewability.

Alternatively, both the planar image P and the spherical image CE may be moving images. In this case, the spherical image CE and the planar image P are displayed as moving images until one of the conditions (i) to (iii) described above is satisfied. When one of the conditions (i) to (iii) is satisfied, the spherical image CE and the planar image P are displayed as still images. Accordingly, when the user U performs an operation for enlarging and displaying the planar image P, the spherical image CE becomes a still image, resulting in increased viewability.

Metadata for Moving Image Replay

The description has been given with reference to FIG. 24 indicating that the user can control replay of a moving image using the menu 200. If metadata related to replay of a moving image is available, the display control apparatus 30 can replay the moving image in accordance with the metadata. Metadata for replay of a moving image is data in which how the moving image is to be replayed is specified.

Figure 29A:
FIGS. 29A to 29C are example diagrams illustrating metadata for replay of a moving image.
Figure 29C:
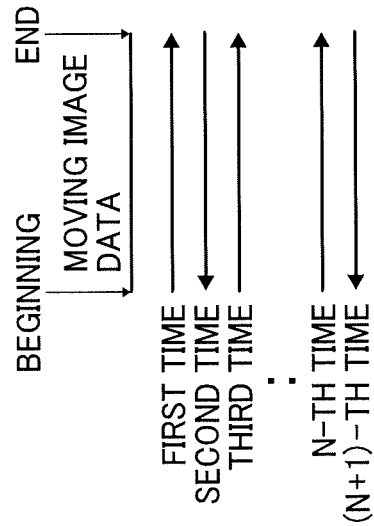
Figure 29B:
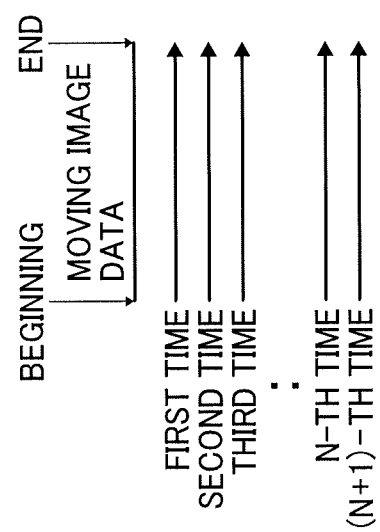

FIGS. 29A to 29C are example diagrams illustrating metadata for replay of a moving image. Metadata for replay of a moving image includes a replay start time, a replay end time, a replay direction, a replay speed, a repetition setting, the number of repetitions, a repetition method, and a state after stop, which are described with reference to FIGS. 29A to 29C.

Replay Start Time

As illustrated in FIG. 29A, the replay start time is a parameter for replaying the moving image from a midpoint instead of the beginning of the moving image and is specified as a time or a frame number. In a case where the replay start time is not specified, the initial value is set to 0.

Replay End Time

The replay end time is a parameter for stopping replay of the moving image at a midpoint without replaying the moving image to the end and is specified as a time or a frame number. In a case where the replay end time is not specified, the initial value is set to the length of the moving image. The replay start time and the replay end time are specified in a case where the user wants to replay only part of the moving image. The moving image that is actually replayed is a portion from the replay start time to the replay end time.

Replay Direction

The replay direction indicates the replay direction when replay of the moving image starts and is set to the forward direction or the reverse direction.

Replay Speed

The replay speed is a parameter for slow replay or fast replay. The usual replay speed is 1.0. The replay speed of less than 1 (for example, 0.5) indicates slow replay, and the replay speed of more than 1 (for example, 2.0) indicates fast replay.

Repetition Setting

The repetition setting is a parameter for specifying whether the moving image is to be repeatedly replayed in a case of replaying the moving image. FIG. 29B illustrates a state where the moving image is repeatedly replayed from the beginning to the end. In a case of non-repetition, after the moving image has been replayed from the beginning to the end, the replay of the moving image ends. In a case where the replay direction is the reverse direction and non-repetition is specified, after the moving image has been replayed from the end to the beginning, the replay of the moving image ends.

Number of Repetitions

The number of repetitions is the number of times the moving image is repeatedly replayed. After the moving image has been repeatedly replayed a specified number of times, the replay of the moving image ends. The number of repetitions can be set to a number that corresponds to an infinite number. In this case, the moving image is repeatedly replayed until a stop condition is satisfied.

Repetition Method

The repetition method is a parameter for specifying a replay method in a case of repeatedly replaying the moving image and is set to loop replay or alternate replay. The loop replay is replay repeated in the same direction, and the alternate replay is replay repeatedly performed in which the replay direction is flipped each time replay ends, as illustrated in FIG. 29C. In both the loop replay and the alternate replay, in a case where the replay direction parameter is set to the reverse direction, the replay direction is flipped.

State after Stop

The state after stop is a parameter for specifying a state after replay of the moving image has stopped. The state after stop is set to "unchanged", "to the beginning" (or "to the end" in the case of replay in the reverse direction), or "transparent".

Accordingly, when metadata is attached to the spherical image CE, the image processing server 70 can control replay of a moving image in the display control apparatus 30.

With the configuration in which the image processing server 70 and the display control apparatus 30 communicate with each other, as illustrated in FIG. 3C, at least one of the image processing server 70 and the display control apparatus 30 can save metadata in association with the location parameter.

As described above, with the display control apparatus 30 according to this embodiment, when it is inferred that the user views the planar image P, a moving image is replayed. Therefore, the moving image can be replayed in a case where the user wants to view the planar image P, and unwanted replay of the moving image can be suppressed. Further, the user can view the moving image from the beginning. When the user enlarges the planar image P, replay of the moving image starts. Therefore, motion seems to start suddenly on the screen, which can attract the user's attention.

Second Embodiment

In this embodiment, the display control apparatus 30 that displays the planar image P on the spherical image CE together with an outline indicating the presence of the planar image P is described. In this embodiment, a constituent element assigned the same reference numeral as that of a corresponding constituent element described in the first embodiment has the same functions as those of the corresponding constituent element. Therefore, description of a constituent element that has been described may be omitted, or only differences may be described.

It may be difficult to know a position in the spherical image CE at which the planar image P is superimposed. In a case where the planar image P that is a still image is also superimposed, the user U may have difficulty in determining whether the planar image P is a moving image or a still image. In such cases, an outline 40 indicating the presence of the planar image P and displayed by the image superimposing unit 33 is effective. If the form of the outline 40 is made different for a still image and a moving image, the user U looking at the outline 40 can know whether the planar image P is a moving image or a still image.

The planar image P that is a moving image or a still image has higher image quality than that of the spherical image CE. When the user U enlarges the spherical image CE to thereby display the enlarged planar image P, the user U can view the image of higher image quality (for example, a higher resolution).

The outline 40 can be displayed in a similar manner to projection conversion of the planar image P. When the first projection converter 28 performs projection conversion of a rectangular indicating the outer edge of the planar image P, the outline 40 is obtained. The first projection converter 28 performs projection conversion of the rectangular indicating the outer edge similarly to a case of projection conversion of the planar image P using the location parameter PP.

Figure 30:
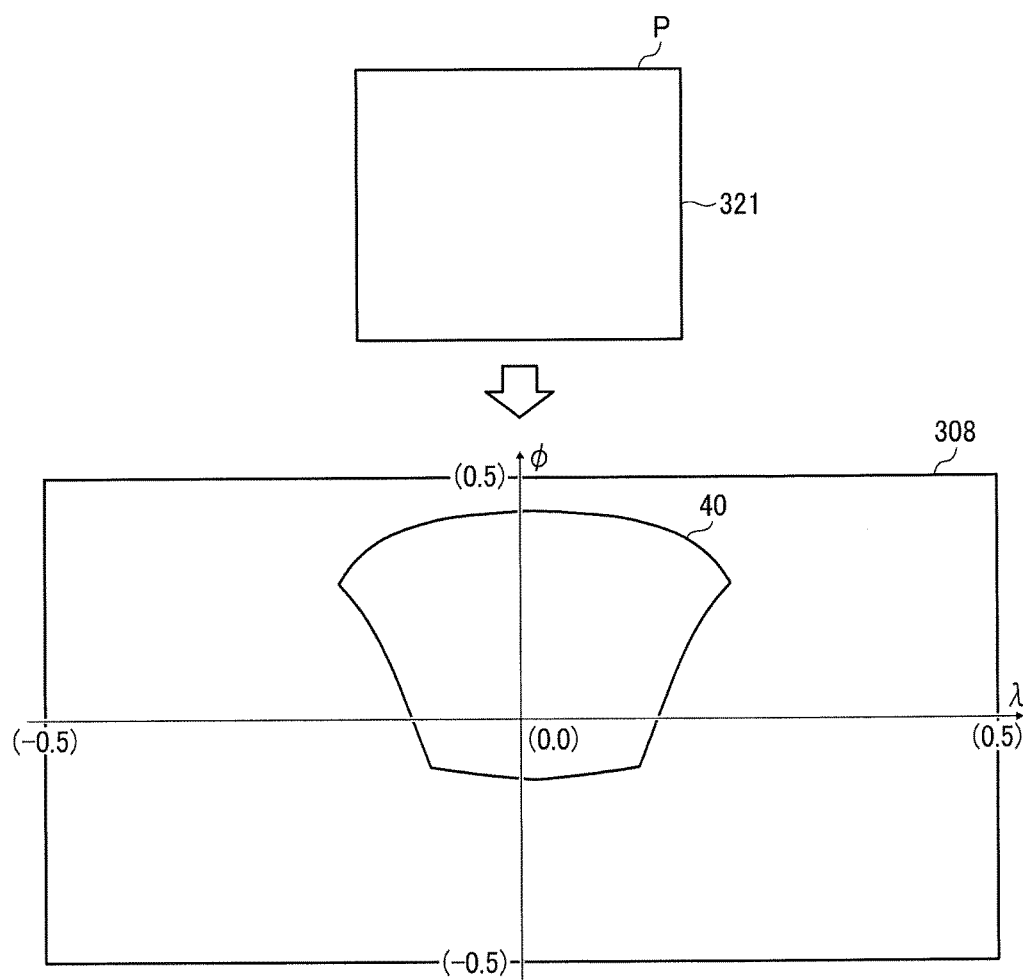
FIG. 30 is an example diagram schematically illustrating an outline obtained as a result of projection conversion.

FIG. 30 is an example diagram schematically illustrating the outline 40 obtained as a result of projection conversion. The first projection converter 28 obtains a transparent layer 308 having the same size (the same number of pixels) as that of the spherical image CE in equirectangular projection. On the transparent layer 308, the first projection converter 28 performs projection conversion of rectangular data 321 that indicates the outer edge of the planar image P. Alternatively, the first projection converter 28 may draw a dotted line that constitutes the outline 40 in accordance with the latitude and longitude of a grid defined by the location parameter PP having values x=0.5, −0.5 or y=0.5, −0.5.

The first projection converter 28 makes the form of the outline 40 different depending on whether the planar image P is a moving image or a still image. For example, the first projection converter 28 changes the color of the outline 40 to red in a case of a moving image and to blue in a case of a still image. The first projection converter 28 may change the line type of the outline 40 to a solid line in the case of a moving image and to a dotted line in a case of a still image. Alternatively, the first projection converter 28 may change the line thickness of the outline 40. The first projection converter 28 may display text indicating whether the planar image P is a moving image or a still image near the outline 40. The planar image reader 25 transmits a notification to the first projection converter 28 whether the planar image P is a moving image or a still image. A moving image and a still image may be distinguished from each other on the basis of, for example, the extension of the file (jpeg indicates a sill image, and mpeg indicates a moving image) or on the basis of the file name of the planar image P.

Figure 31:
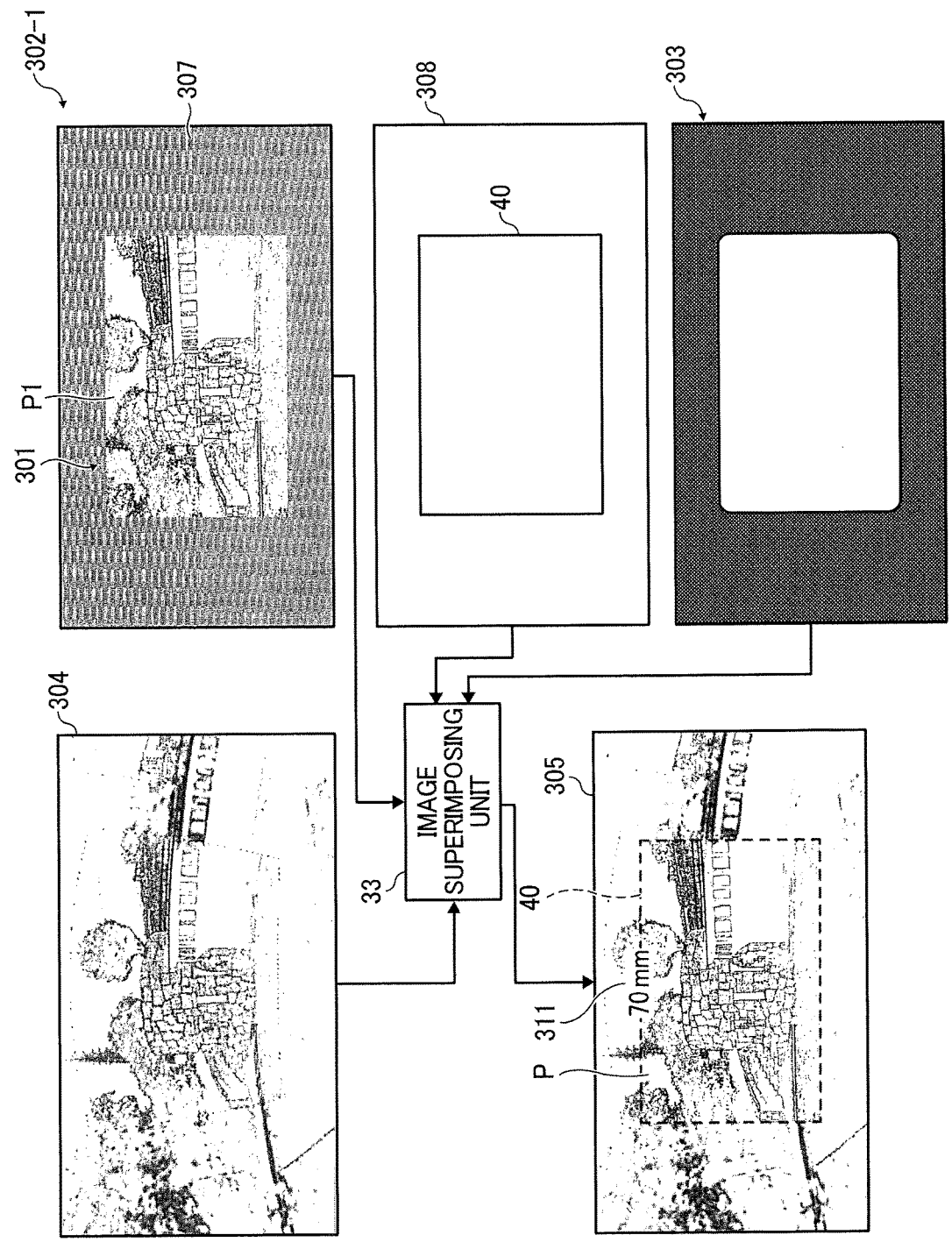
FIG. 31 is an example diagram schematically illustrating superimposition of an outline.

FIG. 31 is an example diagram schematically illustrating superimposition of the outline 40. The display image 304, the projection-converted image 302, the mask data 303, and the transparent layer 308 are input to the image superimposing unit 33. The method for superimposing the projection-converted image 302 on the display image 304 has been described with reference to FIG. 15.

The image superimposing unit 33 uses the mask data 303 to take, from the transparent layer 308, an area corresponding to white pixels in the mask data 303. The image superimposing unit 33 superimposes the area taken from the transparent layer 308 on the superimposed image 305 to thereby display the outline 40 indicating the outer edge of the planar image P.

For example, the user U may perform an operation to switch between display and non-display of the outline 40. In this case, the image superimposing unit 33 switches between display and non-display of the transparent layer 308 in accordance with the operation by the user U. In a case where the mouse cursor is placed over the planar image P, the image superimposing unit 33 may display the outline 40 of the planar image P over which the mouse cursor is placed.

Figure 32:
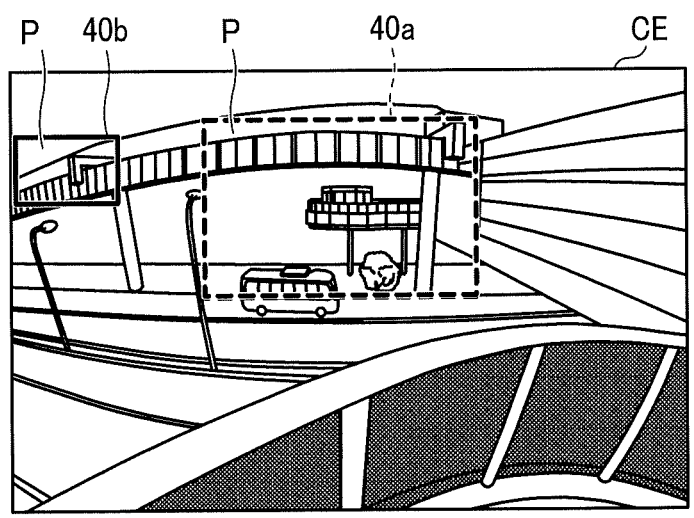
FIG. 32 is a diagram illustrating examples of an outline displayed in different forms for a moving image and a still image.

FIG. 32 is a diagram illustrating examples of the outline 40 displayed in different forms for a moving image and a still image. The moving image is outlined by an outline 40a represented by a dotted line, and the still image is outlined by an outline 40b represented by a solid line. Therefore, the user can easily determine whether the planar image P is a moving image or a still image. Further, the user can know the position and size of the planar image P.

FIG. 33 is an example flowchart illustrating a procedure for the display control apparatus 30 to display the outline 40 of the planar image P on the spherical image CE. In the description of FIG. 33, differences from FIG. 17 are described. The process from step S10 to step S30 is the same as that in FIG. 17. However, in step S30, the location parameter calculator 23 calculates the location parameter PP for all of the planar images P.

The subsequent steps S40 to S90 are performed in a substantially similar manner as described above referring to FIG. 17. After step S90, the first projection converter 28 obtains the rectangular data 321 that indicates the outer edge of the planar image P, the rectangular data 321 having a different form depending on whether the planar image P is a moving image or a still image. The first projection converter 28 performs projection conversion of the rectangular data 321 indicating the outer edge on the transparent layer 308 using the location parameter PP (step S92). As a result, the outline 40 that differs depending on whether the planar image P is a moving image or a still image is projected onto the transparent layer 308.

Subsequently, the image superimposing unit 33 generates the superimposed image 305 (step S100), and uses the mask data 303 to extract the outline 40 from the transparent layer 308 (step S102).

The image superimposing unit 33 determines whether all of the planar images P have been superimposed (step S104). Until all of the planar images P are superimposed, the flow returns to step S70, and the process from step S70 to step S102 is performed.

As described above, the display control apparatus 30 can superimpose the planar image P on the spherical image CE and display the outline 40 having a different form depending on whether the planar image P is a moving image or a still image. It is preferable to stop displaying the outline 40 in a case where one of the conditions (i) to (iii) described above is satisfied. If the outline 40 is not displayed, the outline 40 does not hinder the user U from viewing the planar image P any more.

The image superimposing unit 33 may display the outline 40 only in a case where the user U places the mouse cursor over the planar image P or may display the outline 40 only in a case where the user U does not place the mouse cursor over the planar image P. The user U can move the mouse cursor to switch between display and non-display of the outline 40. The image superimposing unit 33 may display the outline 40 until the time elapsed since a change of the view area T reaches a predetermined time, and thereafter, may stop displaying the outline 40.

The outline 40 may be displayed with the focal length. The outline 40 and focal length information are displayed near the planar image P, and therefore, the user U can know the focal length of the planar image P that is superimposed.

As described above, with the display control apparatus 30 according to this embodiment, the position where the planar image P is superimposed can be indicated by, for example, the outline 40. Further, the user can determine whether the planar image P is a moving image or a still image.

The above-described embodiments are illustrative and do not limit the present invention. Thus, numerous additional modifications and variations are possible in light of the above teachings. For example, elements and/or features of different illustrative embodiments may be combined with each other and/or substituted for each other within the scope of the present invention.

For example, in the above-described embodiments, switching between replay and stop of a moving image is automatically performed; however, the user U may intentionally specify replay or stop of a moving image.

The spherical image CE may be displayed by using browser software or by using application software for displaying the spherical image CE.

In the configuration illustrated in FIG. 3C, the image processing server 70 may perform processing up to generation of the location parameter for display and return the generated location parameter for display and the frame ID to the display control apparatus 30 as metadata. Then, the display control apparatus 30 may perform display using the metadata, the spherical image, and the planar image (that may include a moving image).

The example configurations illustrated in, for example, FIG. 12 and FIG. 18 are divided into blocks in accordance with main functions in order to facilitate understanding of processing by the spherical camera 20, the display control apparatus 30, and the digital camera 9. The present invention is not limited by the way of division into processing units or the names of the processing units. Processing by the spherical camera 20, the display control apparatus 30, and the digital camera 9 can be further divided into a larger number of processing units depending on the details of processing. Further, the processing can be divided such that one processing unit includes a larger number of processes. Regarding the processing performed in the configurations illustrated in FIG. 12 and FIG. 18, either the display control apparatus 30 or the image processing server 70 may perform part or all of the processing.

For example, the image processing server 70 may perform processing up to processing performed by the image superimposing unit 33, and the image display unit 31 may be included in the display control apparatus 30, which is separate from the image processing server 70.

Further, in addition to the above-described specific examples in which it is inferred that the second image is viewed by the user, there are many other example such cases.

For example, when a ratio of an area of the view area T in the spherical image CE with respect to an area of the planar image P in the view area T is less than a predetermined value, it is inferred that the planar image P is viewed by the user, and the planar image P is displayed as a moving image. On the other hand, when a ratio of an area of the view area T in the spherical image CE with respect to an area of the planar image P in the view area T is equal to or greater than the predetermined value, it is inferred that the planar image P is not viewed by the user, and the planar image P is displayed as a still image.

In another example, when a size of the planar image P in the view area T is equal to or larger than a predetermined value, it is inferred that the planar image P is viewed by the user, and the planar image P is displayed as a moving image. On the other hand, when a size of the planar image P in the view area T is less than the predetermined value, it is inferred that the planar image P is not viewed by the user, and the planar image P is displayed as a still image.

In another example, when a difference between the center of the planar image P and center of the view area T is equal to or less than a predetermined value, it is inferred that the planar image P is viewed by the user, and the planar image P is displayed as a moving image. when a difference between the center of the planar image P and center of the view area T is larger than the predetermined value, it is inferred that the planar image P is not viewed by the user, and the planar image P is displayed as a still image.

In any one of the above-described embodiments, when an area of the planar image P in the view area T is large, it is assumed that the user is viewing the planar image P. On the other hand, when an area of the planar image P in the view area T is small, it is assumed that the user is not paying attention to the planar image P. Since the area of the planar image P in the view area T may be defined in various ways, determining whether the user is viewing the planar image P may be performed in various ways as described above. Further, the threshold for comparison may be determined, for example, according to the user preference as described above.

In this disclosure, examples of superimposition of images include, but not limited to, placement of one image on top of other image entirely or partly, laying one image over other image entirely or partly, mapping one image on other image entirely or partly, pasting one image on other image entirely or partly, combining one image with other image, and integrating one image with other image. That is, as long as the user can perceive a plurality of images (such as the spherical image and the planar image) being displayed on a display as they were one image, processing to be performed on those images for display is not limited to the above-described examples.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

The invention claimed is:

1. An apparatus for controlling a display, the apparatus comprising:
   circuitry configured to
      control the display to display an image of a predetermined area of a first captured image and display a second captured image in a superimposed manner on the image;
      determine whether the displayed second image is being viewed by a user; and
      switch a display of the second image from a first display in which the second image is displayed as a still image to a second display in which the second image is displayed as a moving image, based on a determination result indicating whether the second image is being viewed by the user.

2. The apparatus of claim 1,
   wherein, when the determination result indicates that the second image is being viewed by the user, the circuity is further configured to cause the second image to be displayed as the moving image, and
   when the determination result indicates that the second image is not being viewed by the user, the circuitry is further configured to cause the second image to be displayed as the still image.

3. The apparatus of claim 1,
   wherein the circuitry is configured to determine that the second image is being viewed by the user, when a ratio of the predetermined area in the first image with respect to an area of the second image in the predetermined area is equal to or less than a threshold, and
   wherein the circuitry is configured to determine that the second image is not being viewed by the user, when a ratio of the predetermined area in the first image with respect to an area of the second image in the predetermined area is greater than the threshold.

4. The apparatus of claim 1,
   wherein the circuitry is configured to determine that the second image is being viewed by the user, when an angle of view of the second image in the predetermined area with respect to an angle of view of the predetermined area is equal to or greater than a threshold, and
   wherein the circuitry is configured to determine that the second image is not being viewed by the user, when an angle of view of the second image in the predetermined area with respect to an angle of view of the predetermined area is less than the threshold.

5. The apparatus of claim 1,
wherein the circuitry is configured to determine that the second image is being viewed by the user, when a size of the second image in the predetermined area is equal to or greater than a threshold, and
the circuitry is configured to determine that the second image is not being viewed by the user, when a size of the second image in the predetermined area is less than the threshold.

6. The apparatus of claim 1,
wherein the circuitry is configured to determine that the second image is being viewed by the user, when an area of the second image has an angle of view equal to or greater than a threshold, and
wherein the circuitry is configured to determine that the second image is not being viewed by the user, when an area of the second image has an angle of view less than the threshold.

7. The apparatus of claim 1,
wherein, in response to a user selection of a coordinate in the predetermined area, the circuity is configured to determine whether the selected coordinate matches any coordinate in the second image,
wherein the circuitry is configured to determine that the second image is being viewed by the user, based on a determination indicating that the selected coordinate matches any coordinate in the second image, and
wherein the circuitry is configured to determine that the second image is not being viewed by the user, based on a determination indicating that the selected coordinate does not match any coordinate in the second image.

8. The apparatus of claim 7,
wherein, when the circuitry is configured to determine that the second image is being viewed by the user based on the determination indicating that the selected coordinate matches any coordinate in the second image, and
the circuitry is configured to gradually increase a size of the second image to a size of the predetermined area.

9. The apparatus of claim 1,
wherein the second image includes the still second image to be displayed as the still image, and a moving second image to be displayed as the moving image, and
wherein the circuitry is configured to control the display to further display information indicating an area of the first image being superimposed with the second image.

10. The apparatus of claim 1, wherein the circuitry is configured to control replay of the moving image according to information specifying at least one of a replay start time, a replay end time, a replay direction, a replay speed, a repetition setting, a number of repetitions, and a repetition method.

11. The apparatus of claim 1, wherein the first image is a spherical image and the second image is a planar image.

12. The apparatus of claim 1, further comprising:
the display to display the image of the predetermined area of the first image, on which the second image is superimposed.

13. A system comprising:
the apparatus of claim 1; and
the display to display the image of the predetermined area of the first image, on which the second image is superimposed.

14. The apparatus of claim 1, wherein the still image is a still second image of the moving image and the circuitry is configured to display the second still image, which corresponds to a first frame of the moving image.

15. A method of controlling a display, comprising:
displaying, on the display, an image of a predetermined area of a first captured image and displaying a second captured image, in a superimposed manner, on the image;
determining whether the displayed second image is being viewed by a user; and
switching a display of the second image from a first display in which the second image is displayed as a still image to a second display in which the second image is displayed as a moving image, based on a determination result indicating whether the second image is being viewed by the user.

16. A non-transitory recording medium storing a plurality of instructions which, when executed by one or more processors, cause the processors to perform a method of controlling a display, comprising:
displaying, on the display, an image of a predetermined area of a first captured image and displaying a second captured image, in a superimposed manner, on the image;
determining whether the second image is viewed by a user; and
switching a display of the second image from a first display in which the second image is displayed as a still image to a second display in which the second image is displayed as a moving image, based on a determination result indicating whether the second image is being viewed by the user.

* * * * *